(12) United States Patent
Zhou et al.

(10) Patent No.: US 12,108,364 B2
(45) Date of Patent: Oct. 1, 2024

(54) METHOD AND TERMINAL FOR DETERMINING SIDELINK RESOURCES FOR SIDELINK SIGNALING TRANSMISSION

(71) Applicant: Samsung Electronics Co., Ltd., Gyeonggi-do (KR)

(72) Inventors: Miao Zhou, Beijing (CN); Feifei Sun, Beijing (CN); Min Wu, Beijing (CN)

(73) Assignee: Samsung Electronics Co., Ltd. (KR)

( * ) Notice: Subject to any disclaimer, the term of this patent is extended or adjusted under 35 U.S.C. 154(b) by 180 days.

(21) Appl. No.: 17/501,581

(22) Filed: Oct. 14, 2021

(65) Prior Publication Data
US 2022/0116915 A1     Apr. 14, 2022

(30) Foreign Application Priority Data

Oct. 14, 2020 (CN) .......................... 202011098825.3

(51) Int. Cl.
| | | |
|---|---|---|
| H04W 72/04 | (2023.01) | |
| H04L 1/1812 | (2023.01) | |
| H04L 5/00 | (2006.01) | |
| H04W 72/02 | (2009.01) | |
| H04W 74/0808 | (2024.01) | |

(52) U.S. Cl.
CPC .......... *H04W 72/02* (2013.01); *H04L 1/1819* (2013.01); *H04L 5/0053* (2013.01); *H04W 74/0808* (2013.01)

(58) Field of Classification Search
CPC ..... H04W 72/02; H04W 72/20; H04W 72/25; H04W 72/53; H04W 72/563; H04W 74/0808; H04W 92/18; H04L 1/1819; H04L 1/1671; H04L 5/0053; H04L 5/0044; H04L 5/0055; H04L 5/0094
See application file for complete search history.

(56) References Cited

U.S. PATENT DOCUMENTS

| | | | | |
|---|---|---|---|---|
| 2019/0306835 | A1* | 10/2019 | Hoang | .................. H04W 72/53 |
| 2021/0359788 | A1* | 11/2021 | Uziel | .................... H04L 5/0094 |
| 2022/0046602 | A1* | 2/2022 | Hosseini | ............... H04W 28/26 |

(Continued)

FOREIGN PATENT DOCUMENTS

WO     WO 2020/028662     2/2020

OTHER PUBLICATIONS

R1-2006876, Sidelink Resource Allocation Enhancements, Robert Bosch GmbH, 3GPP TSG RAN WG1 #102-e, E-Meeting, Aug. 17-28, 2020 (Year: 2020).*

Moderator (LG Electronics), "Summary for AI 8.11.2.2 Feasibility and Benefits for Mode 2 Enhancements", R1-2007412, #3GPP TSG RAN WG1 #102-e. Aug. 17-28, 2020, 34 pages.

(Continued)

*Primary Examiner* — Mahbubul Bar Chowdhury
(74) *Attorney, Agent, or Firm* — The Farrell Law Firm, P.C.

(57) ABSTRACT

Disclosed is a method performed by a user equipment (UE) including generating, by a first UE, first information, and transmitting the first information to a second UE, the first information being used, at the second UE, as reference information for selecting resources, wherein content of the first information includes at least one of resources preferred by the first UE, resources not preferred by the first UE, a channel sensing result from the first UE, transmission parameters preferred by the first UE, and transmission parameters not preferred by the first UE.

12 Claims, 8 Drawing Sheets

(56) References Cited

U.S. PATENT DOCUMENTS

| | | | | |
|---|---|---|---|---|
| 2022/0046627 | A1* | 2/2022 | Hosseini | H04W 72/20 |
| 2022/0046653 | A1* | 2/2022 | Hosseini | H04W 72/20 |
| 2022/0046664 | A1* | 2/2022 | Hosseini | H04W 28/26 |
| 2022/0061095 | A1* | 2/2022 | Xue | H04W 72/02 |
| 2022/0070849 | A1* | 3/2022 | Hosseini | H04W 72/20 |
| 2022/0070921 | A1* | 3/2022 | Xue | H04W 72/044 |
| 2022/0167315 | A1* | 5/2022 | Park | H04W 72/0446 |
| 2023/0164814 | A1* | 5/2023 | Miao | H04W 72/40 |
| | | | | 370/329 |
| 2023/0189292 | A1* | 6/2023 | Ganesan | H04L 5/0053 |
| | | | | 370/329 |
| 2023/0199722 | A1* | 6/2023 | Hwang | H04W 28/26 |
| | | | | 370/329 |
| 2023/0239900 | A1* | 7/2023 | Park | H04W 72/02 |
| | | | | 370/329 |
| 2023/0362934 | A1* | 11/2023 | Grieco | H04W 76/11 |

OTHER PUBLICATIONS

Qualcomm Incorporated, "Reliability and Latency Enhancements for Mode 2", R1-2006829, 3GPP TSG RAN WG1 Meeting #102-e, Aug. 17-28, 2020, 9 pages.

OPPO, "Inter-UE Coordination in Mode 2 of NR Sidelink", R1-2006011, 3GPP TSG RAN WG1 #102-e, Aug. 17-28, 2020, 3 pages.

Ericsson, "Feasibility and Benefits of Mode 2 Enhancements for Inter-UE Coordination", R1-2006445, 3GPP TSG-RAN WG1 Meeting #102-e, Aug. 17-28, 2020, 7 pages.

International Search Report dated Jan. 21, 2022 issued in counterpart application No. PCT/KR2021/014127, 10 pages.

MediaTek Inc., "Discussion on Mode 2 Enhancements", R1-2005645, 3GPP TSG RAN WG1 #102, Aug. 17-28, 2020, 3 pages.

Qualcomm Incorporated, "Remaining MAC Issues", R2-2005575, 3GPP TSG RAN WG2 #110-e, Jun. 1-5, 8-12, 2020, 13 pages.

European Search Report dated Mar. 11, 2024 issued in counterpart application No. 21880507.5-1215, 8 pages.

* cited by examiner

METHOD AND TERMINAL FOR DETERMINING SIDELINK RESOURCES FOR SIDELINK SIGNALING TRANSMISSION

CROSS-REFERENCE TO RELATED APPLICATION(S)

This disclosure is based on and claims priority under 35 U.S.C. § 119 to Chinese Patent Application No. 202011098825.3, filed on Oct. 14, 2020, in the Chinese Patent Office, the content of which is incorporated by reference herein in its entirety.

BACKGROUND

1. Field

The disclosure relates generally to wireless communication, and more particularly, to a method and device for determining sidelink (SL) resources for transmitting sidelink signaling in sidelink communication in a Fifth generation new radio (5G NR) access technical system.

2. Description of Related Art

To meet the ever-increasing demand for wireless data traffic since deployment of the fourth generation (4G) communication systems, efforts have been made to develop an improved 5G or pre-5G communication system, which is also referred to as a beyond 4G network or a post long term evolution (LTE) system. The 5G communication system is implemented in higher frequency millimeter wave (mm-Wave) bands, e.g., 60 GHz bands, so as to accomplish higher data rates.

To decrease propagation loss of the radio waves and increase the transmission distance, beamforming, massive multiple-input multiple-output (MIMO), full dimensional MIMO (FD-MIMO), array antenna, analog beamforming, and large-scale antenna techniques are considered with respect to 5G communication systems. In addition, in 5G communication systems, r system network improvement is being developed based on such parameters as advanced small cells, cloud radio access networks (RANs), ultra-dense networks, device-to-device (D2D) communication, wireless backhaul, moving network, cooperative communication, coordinated multi-points (CoMP), and reception-end interference cancellation. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, and machine type communication (MTC) have been researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, efforts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered as an example of convergence between the 5G technology and the IoT technology.

As seen above, the conventional art lacks a simplified and reliable manner for providing various services to users according to the development of a wireless communication system, and thus a method for easily and reliably providing such services is required.

SUMMARY

Aspects of the disclosure are to address at least the above-mentioned problems and/or disadvantages and to provide at least the advantages described below.

Accordingly, an aspect of the disclosure is to provide a method for a user equipment (UE) to assist other sidelink UEs to select sidelink resources, which may enable other sidelink UEs to select appropriate resources for sidelink transmission not only by channel sensing but also by obtaining resource information from other UEs when serving as a transmitter of sidelink communication, thereby improving the reliability of the sidelink transmission and the utilization efficiency of the sidelink resources.

In accordance with an aspect of the disclosure, a method performed by a UE includes generating, by a first UE, first information, and transmitting the first information to a second UE, the first information being used, at the second UE, as reference information for selecting resources, wherein content of the first information includes at least one of resources preferred by the first UE, resources not preferred by the first UE, a channel sensing result from the first UE, transmission parameters preferred by the first UE, and transmission parameters not preferred by the first UE.

In accordance with another aspect of the disclosure, a terminal includes a transceiver for transmitting and receiving signals, a processor; and a memory storing instructions executable by the processor that, when executed by the processor, cause the processor to perform a method including generating, by a first UE, first information, and transmitting the first information to a second UE, the first information being used, at the second UE, as reference information for selecting resources, wherein content of the first information includes at least one of resources preferred by the first UE, resources not preferred by the first UE, a channel sensing result from the first UE, transmission parameters preferred by the first UE, and transmission parameters not preferred by the first UE.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
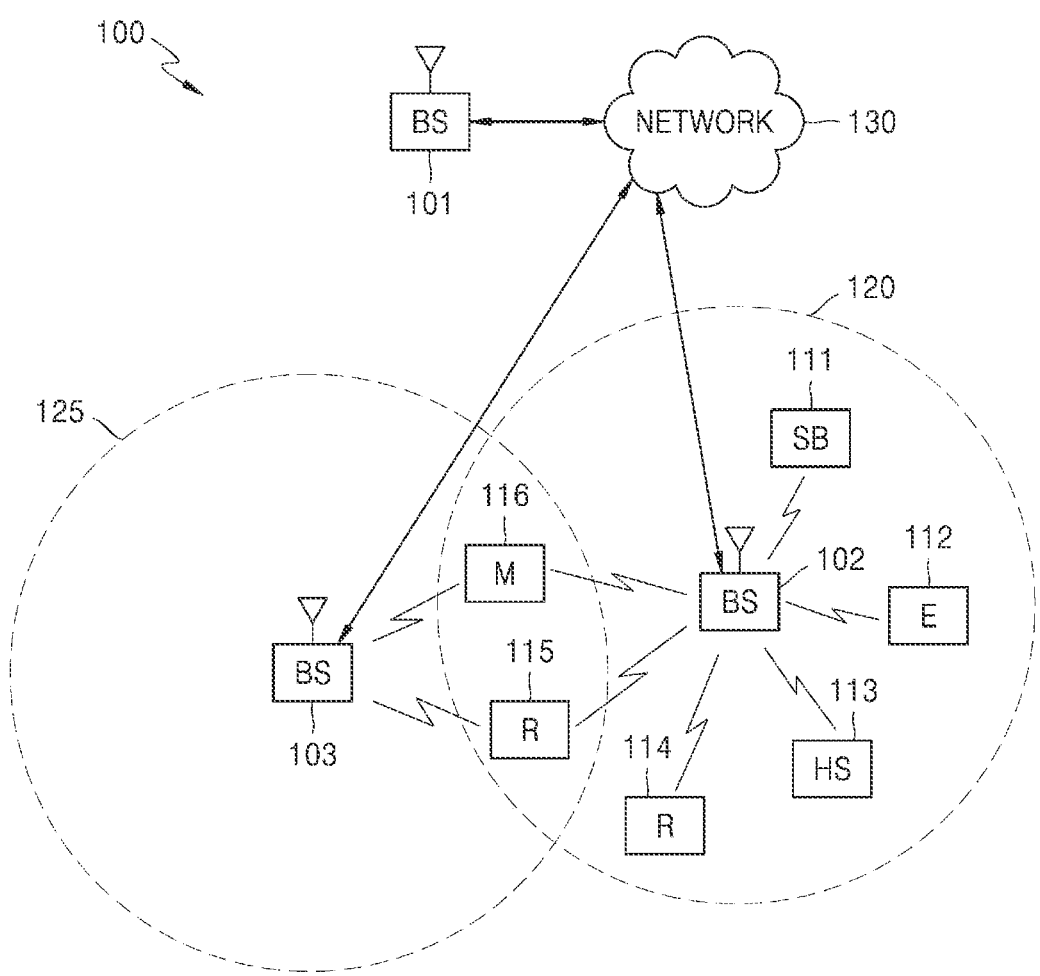
FIG. 1 illustrates a wireless network according to an embodiment.

Embodiments of the disclosure will be described with reference to the accompanying drawings. Accordingly, those of ordinary skill in the art will recognize that modifications, equivalents, and/or alternatives on the embodiments described herein can be variously made without departing from the scope and spirit of the disclosure. In addition, descriptions of well-known functions and constructions may be omitted for clarity and conciseness.

The terms and words used in the following description and claims are not limited to the bibliographical meanings but are merely used to enable a clear and consistent understanding of the disclosure. Therefore, it will be apparent to those skilled in the art that the following descriptions of the embodiments of the disclosure are provided for illustrative purposes only and are not intended to limit the disclosure.

Unless otherwise defined, the technical or scientific terms used in the disclosure shall have the ordinary meanings understood by those having ordinary skills in the field to which the invention pertains. The terms "first", "second", and the like used in this disclosure do not indicate any order, quantity, or importance, but are only used to distinguish different components. Similarly, "a", "an", or "the" and the like do not indicate a limit on quantity, but rather indicate that there is at least one. Words such as "including" or "comprising" indicate that the element or item appearing before the word encompasses the element or item appearing after the word and the equivalent thereof without excluding other elements or items. Words such as "connected" or "interconnected" are not limited to physical or mechanical connections, but may include electrical connections, whether direct or indirect. "Upper", "lower", "left", "right", etc. are only used to indicate the relative positional relationship, and when the absolute position of the object to be described is changed, the relative positional relationship may also be changed accordingly.

The advantages and features of one or more embodiments of the disclosure and implementation methods thereof can be more easily understood by referring to the following detailed description of the embodiments and the accompanying drawings. In this regard, the embodiment may have different forms and should not be construed as being limited to the descriptions set forth herein. Rather, these embodiments are provided so that this disclosure will be thorough and complete and will fully convey the concept of the embodiments to those skilled in the art.

A flowchart or a combination of blocks in a process flowchart may be executed by computer program instructions. These computer program instructions can be loaded into a processor of a general purpose computer, special purpose computer, or another programmable data processing device, so the instructions executed by a computer or a processor of another programmable data processing device are created for execution unit of functions described in flowchart block(s). Computer program instructions may be stored in a computer-usable or computer-readable memory capable of directing a computer or another programmable data processing device to perform a function in a particular way, and therefore, instructions stored in the computer-usable or computer-readable memory can also produce manufacturing items that contain instruction units for performing the functions described in the flowchart block. Computer program instructions may also be loaded into a computer or another programmable data processing device, and therefore, when a series of operations are performed in the computer or the other programmable data processing device, instructions of the computer or the other programmable data processing device operated by generating a process performed by the computer can provide operations for performing the functions described in the flowchart block.

In addition, each block may represent a module, segment, or portion of code, where the module, segment, or code includes one or more executable instructions for performing specified logical function(s). It should also be noted that in some alternative implementations, the functions mentioned in the block may not appear in order. For example, two blocks shown in sequence may in fact be executed concurrently, or the blocks may sometimes be executed in a reverse order according to corresponding functions.

The term "unit" used herein may indicate a software component or a hardware component (such as a field programmable gate array (FPGA) or an application specific integrated circuit (ASIC)) that performs a specific function. However, the term "unit" is not limited to software or hardware. A "unit" may be formed to be in an addressable storage medium or may be formed to operate one or more processors. Thus, for example, the term "unit" may refer to components such as software components, object-oriented software components, class components, and task components, and may include procedures, functions, properties, programs, subroutines, program code segments, drivers, firmware, microcode, circuits, data, databases, data structures, tables, arrays, or variables. The functions provided by components and "units" can be associated with fewer components and "units" or can be divided into additional components and "units". In addition, components and "units" may be embodied as reproducing one or more central processing central processing units (CPUs) in a device or a secure multimedia card, and a "unit" may include at least one processor.

Herein, when it is considered that some detailed explanations about functions or configurations may unnecessarily obscure the essence of the disclosure, these detailed explanations will be omitted. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description throughout the specification.

Hereinafter, for example, the base station may be at least one of a gNode B, an eNode B, a Node B, a radio access unit, a base station controller, and a node on a network. The terminal may include a UE, a mobile station (MS), a mobile phone, a smart phone, a computer or multimedia system capable of performing communication functions. In some embodiments of the disclosure, the downlink (DL) is a wireless transmission path through which signals are transmitted from a base station to a terminal, and the uplink (UL) is a wireless transmission path through which signals are transmitted from a terminal to a base station. In addition, one or more embodiments of the disclosure may be applied to 5G NR developed after LTE-advanced (LTE-A), or to new wireless communication technologies proposed on the basis of 4G or 5G (for example, B5G (Beyond 5G) or sixth generation (6G)).

In LTE technology, sidelink communication includes two main types of mechanisms including direct D2D communication and vehicle to outside communication (Vehicle to Vehicle/Infrastructure/Pedestrian/Network, collectively referred to as V2X), where the V2X communication is designed based on the D2D technology, is superior to the D2D in data rate, delay, reliability and link capacity, and is the most representative sidelink communication technology in LTE technology. In current 5G systems, sidelink communication mainly includes V2X communication.

There are several sidelink physical channels defined in NR V2X systems, including a physical sidelink control channel (PSCCH), a physical sidelink shared channel (PSSCH) and a physical sidelink feedback channel (PSFCH). The PSSCH is used to carry data, the PSCCH is used to carry sidelink control information (SCI), in which information such as a time-frequency domain resource location, a modulation and coding mode of associated PSSCH transmission, an identifier ID of a receiving target at which an associated PSSCH is directed is indicated, and the PSFCH is used to carry hybrid automatic repeat request-acknowledgement (HARQ-ACK) information corresponding to the data.

Present NR V2X systems take a slot in 5G systems as a minimum unit of time-domain resource allocation and define a subchannel as a minimum unit of frequency-domain resource allocation, wherein one subchannel is configured as several resource blocks (RBs) in frequency domain, and one subchannel may include resources corresponding to at least one of the PSCCH, PSSCH and PSFCH.

From the perspective of resource allocation, 5G sidelink communication systems include two modes: one is a resource allocation mode based on base station scheduling; the other is a resource allocation mode in which a User Equipment (UE) selects independently. In 5G V2X systems, the resource allocation mode based on base station scheduling is referred to as Mode 1, and the resource allocation mode independently selected by a UE is referred to as Mode 2.

For Mode 1, the resource allocation mode based on base station scheduling indicates that a base station transmits a sidelink grant to a UE for sidelink transmission (hereinafter, a "sidelink UE"), and indicates several sidelink resources for the sidelink UE to use in the sidelink grant, and/or indicates periodic sidelink resources for the sidelink UE to use in the sidelink grant. The sidelink grant includes a dynamic grant and a configured grant, wherein the dynamic grant is indicated by downlink control information (DCI); the configured grant further includes a type 1 configured grant indicated by radio resource control (RRC) signaling and a type 2 configured grant indicated by RRC signaling and indicated to be activated/deactivated by DCI.

For Mode 2, a method for the sidelink UE to independently select resources indicates that the UE determines a specific time window before performing sidelink transmission according to a time range within which the sidelink transmission is expected to be transmitted, and the UE performs channel sensing in the specific time window, then excludes sidelink resources that have been reserved by other sidelink UEs according to a result of the channel sensing, and randomly selects in sidelink resources that have not been excluded.

When using Mode 2, UE may only determine which resources have been reserved by other UEs and therefore are not suitable for transmission of this UE according to content of successfully received SCI which is transmitted by other sidelink UEs. However, there is a possibility for the UE to miss the detection of SCI transmitted by other sidelink UEs, so resources reserved in the SCI, detection of which is missed, cannot be excluded, thus affecting the reliability. In addition, there is a problem of hidden nodes in sidelink communication, and a transmitter UE can only sense interference of other sidelink UEs within a communication range of the transmitter UE itself but cannot sense interference of other sidelink UEs within a communication range of a receiver UE. Thus, the receiver UE experiences conflict due to the hidden nodes issue.

When using Mode 1, the base station cannot sense a channel condition at the transmitter UE, so it cannot avoid data or interference from other sidelink UEs that the transmitter UE may receive when scheduling transmission resources for the transmitter UE. Thus, the base station may schedule resources with relatively poor channel quality or conflict with other sidelink reception for the transmitter UE.

In addition, a group of UEs is supported if there is a group manager UE. The group manager UE may further optimize the utilization efficiency of sidelink resources by deploying and coordinating transmission resources of other sidelink UEs within the group.

The sidelink UE needs to maintain monitoring on an entire configured resource pool, which causes excessive power consumption. In addition, channel sensing is also based on the premise that the UE monitors and caches the resource pool, so performing channel sensing has certain requirements for a UE's monitoring behavior and caching ability. UEs that are sensitive to power consumption and may have weak caching capacity will be introduced in a future release and are not suitable to employ the current mechanism. After introducing the UE assistance mechanism, the UE may partially replace the channel sensing with received assistance information, thus reducing power consumption of monitoring the resource pool accordingly.

The text and drawings are provided as examples only to help readers understand the disclosure and are not intended and should not be interpreted as limiting the scope of the disclosure in any manner. Although certain embodiments and examples have been provided, based on the content disclosed herein, it is obvious to those skilled in the art that modifications to the illustrated embodiments and examples can be made without departing from the scope of the disclosure.

A slot in embodiments of the disclosure may be either a subframe or slot in a physical sense, or a subframe or slot in a logical sense. Specifically, a subframe or slot in a logical sense is a subframe or slot corresponding to a resource pool of a sidelink communication. For example, in the V2X system, the resource pool is defined by a repeated bitmap mapped to a specific slot set, which may be all slots or all other slots except some specific slots (such as slots for transmitting the MIB/SIB). A slot indicated as "1" in the bitmap may be used for V2X transmission and belongs to slots corresponding to the V2X resource pool. A slot indicated as "0" cannot be used for V2X transmission and does not belong to slots corresponding to the V2X resource pool.

The difference between subframes or slots in a physical sense and that in a logical sense is explained by a typical application scenario: when calculating the time domain gap between two specific channels/messages (e.g., a PSSCH carrying sidelink data and a PSFCH carrying corresponding feedback information), and it is assumed that the gap is N slots, if calculating subframes or slots in a physical sense, the N slots correspond to the absolute time length of N*x milliseconds in the time domain, and x is the time length of a physical slot (subframe) under the numerology of the scenario, in milliseconds; otherwise, if calculating subframes or slots in a logical sense, taking a sidelink resource pool defined by a bitmap as an example, the intervals among the N slots correspond to N slots indicated as "1" in the bitmap, and the absolute time length of the interval varies with the specific configuration of the sidelink communication resource pool, rather than a fixed value.

Herein, a slot may be a complete slot or several OFDM symbols corresponding to a sidelink communication in a slot. For example, when the sidelink communication is configured to be performed on the X1-X2-th OFDM symbols in each slot, in this scenario, a slot in the following embodiments refers to the X1-X2-th OFDM symbols in a slot; for another example, when the sidelink communication is configured to be transmitted in a mini-slot, in this scenario, a slot in the following embodiments refers to the mini-slot defined or configured in the sidelink system, rather than the slot in the NR system; for still another example, when the sidelink communication is configured as symbol-level transmission, in this scenario, a slot in the embodiment may be replaced with OFDM symbols, or may be replaced with N OFDM symbols which are the time domain granularity of the symbol-level transmission.

Herein, information configured by the base station, information indicated by signaling, information configured by a higher layer, and preconfigured information may be a set of configuration information or multiple sets of configuration information. When information contains multiple sets of configuration information, the UE selects a set of configuration information from the multiple sets of configuration information for use according to a predefined condition. When information is a set of configuration information, the set of configuration information may contain multiple subsets, and the UE selects a subset from the multiple subsets for use according to a predefined condition.

Some of the technical solutions provided are specifically described based on the V2X system, but their application scenarios should not be limited to the V2X system in sidelink communication but may also be applied to other sidelink transmission systems. For example, the design based on V2X subchannels in the following embodiments may also be used for D2D subchannels or other subchannels for sidelink transmission. The V2X resource pool in the following embodiments may also be replaced by the D2D resource pool in other sidelink transmission systems such as the D2D.

A "below a threshold value" may also be replaced by at least one of "above a threshold value", "below or equal to a threshold value", and "above or equal to a threshold value"; similarly, "higher than a threshold value" may be replaced by at least one of "lower than a threshold value", "lower than or equal to a threshold value", and "higher than or equal to a threshold value". Among them, the related expressions may be replaced by other expressions with the same or similar meanings, for example, "higher than" may also be expressed as "exceeding".

A UE used for transmitting a physical sidelink data channel is referred to as a transmitter UE and is denoted as a TX UE; and a UE used for receiving physical sidelink data channel is referred to as a receiver UE and is denoted as an RX UE.

Herein, when a sidelink communication system is the V2X system, a terminal or UE may be various types of terminals or UEs such as a vehicle, an infrastructure, or a pedestrian.

Hereinafter, one or more embodiments of the present disclosure will be described with reference to the accompanying drawings.

FIG. 1 illustrates a wireless network 100 according to an embodiment.

The wireless network 100 includes a gNB 101, a gNB 102, and a gNB 103. gNB 101 communicates with gNB 102 and gNB 103. gNB 101 also communicates with at least one Internet protocol (IP) network 130, such as the Internet, a private IP network, or other data networks.

Depending on a type of the network, base station or access point can be used instead of gNB. For convenience, the terms gNodeB and gNB are used herein to refer to network infrastructure components that provide wireless access for remote terminals. Depending on the type of the network, other well-known expressions such as mobile station, user station, remote terminal, wireless terminal or user apparatus can be used instead of user equipment or UE. For convenience, a UE herein refers to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of UEs within a coverage area 120 of gNB 102. The first plurality of UEs includes UE 111, which may be located in a small business (SB), UE 112, which may be located in an enterprise (E), UE 113, which may be located in a wireless fidelity (WiFi) hotspot (HS), UE 114, which may be located in a first residence (R), UE 115, which may be located in a second residence (R), UE 116, which may be a mobile device (M), such as a cellular phone, a wireless laptop computer, a wireless packet data assistant (PDA), etc. The gNB 103 provides wireless broadband access to network 130 for a second plurality of UEs within a coverage area 125 of gNB 103. The second plurality of UEs include UE 115 and UE 116. One or more of gNBs 101-103 can communicate with each other and with UEs 111-116 using 5G, LTE, LTE-A, Worldwide Interoperability for Microwave Access (WiMAX) or other advanced wireless communication technologies.

The dashed lines illustrate approximate ranges of the coverage areas 120 and 125, and the ranges are shown as approximate circles merely for illustration and explanation purposes. It should be understood that the coverage areas associated with the gNBs, such as the coverage areas 120 and 125, may have other shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. One or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
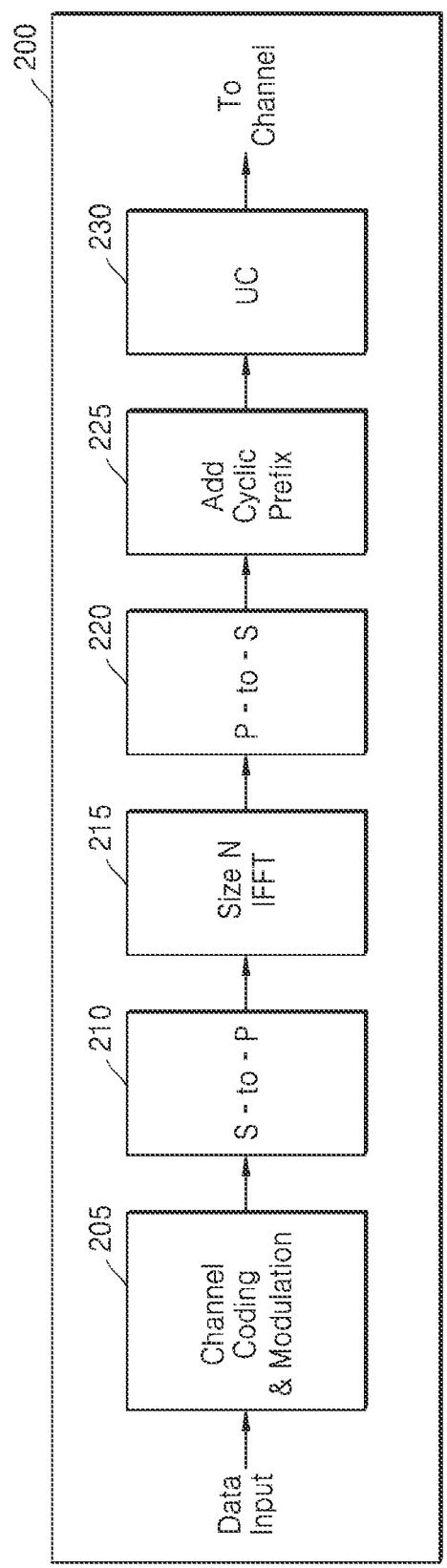
FIG. 2A illustrates wireless transmit paths according to an embodiment.
Figure 2B:
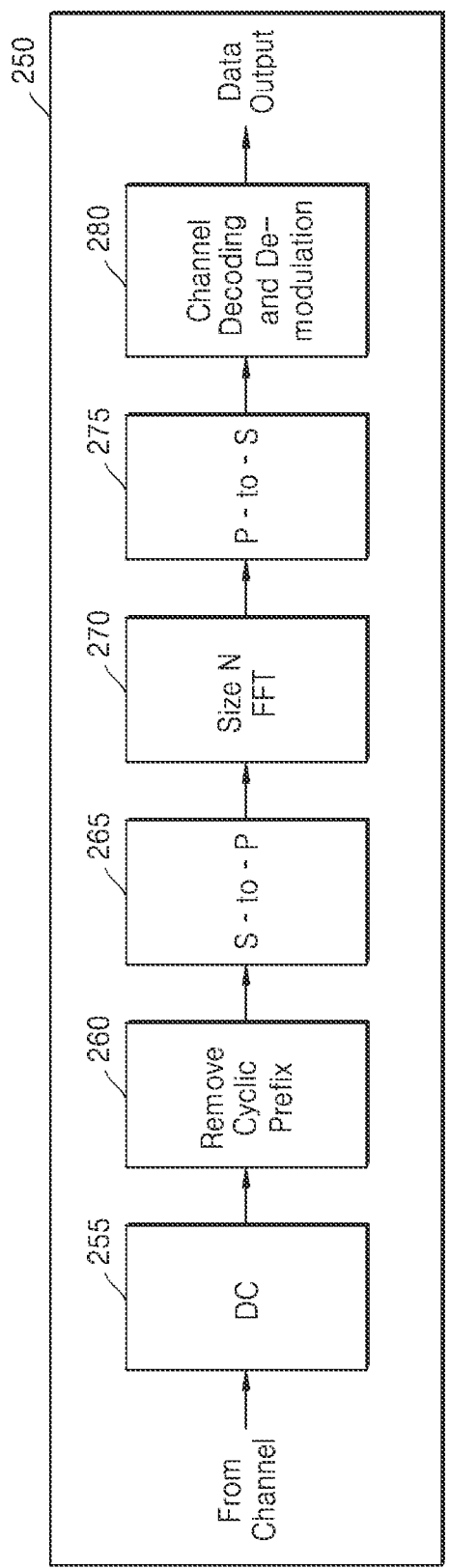
FIG. 2B illustrates wireless receive paths according to an embodiment.

FIGS. 2A and 2B illustrate wireless transmission and reception paths according to an embodiment. In the following description, the transmission path 200 can be described as being implemented in gNB 102, and the reception path 250 can be described as being implemented in UE 116. However, it should be understood that the reception path 250 can be implemented in a gNB and the transmission path 200 can be implemented in a UE. The reception path 250 is configured to support codebook designs and structures for systems with two-dimensional (2D) antenna arrays as described in embodiments of the disclosure.

In FIG. 2A, the transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230.

In FIG. 2B, the reception path 250 includes a down-converter (DC) 255, a cyclic prefix removal block 260, an S-to-P block 265, a size N FFT block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The S-to-P block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The P-S block 220 converts (such as multiplexes) parallel time-domain output symbols from the size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to RF for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The S-P block 265 converts the time-domain baseband signal into a parallel time-domain signal. The size N FFT block 270 performs an FFT algorithm to generate N parallel frequency-domain signals. The P-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink and may implement a reception path 250 similar to that for receiving from UEs 111-116 in the uplink. Similarly, each of UEs 111-116 may implement a transmission path 200 for transmitting to gNBs 101-103 in the uplink and may implement a reception path 250 for receiving from gNBs 101-103 in the downlink.

Each of the components in FIGS. 2A and 2B can be implemented using only hardware or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse DFT (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
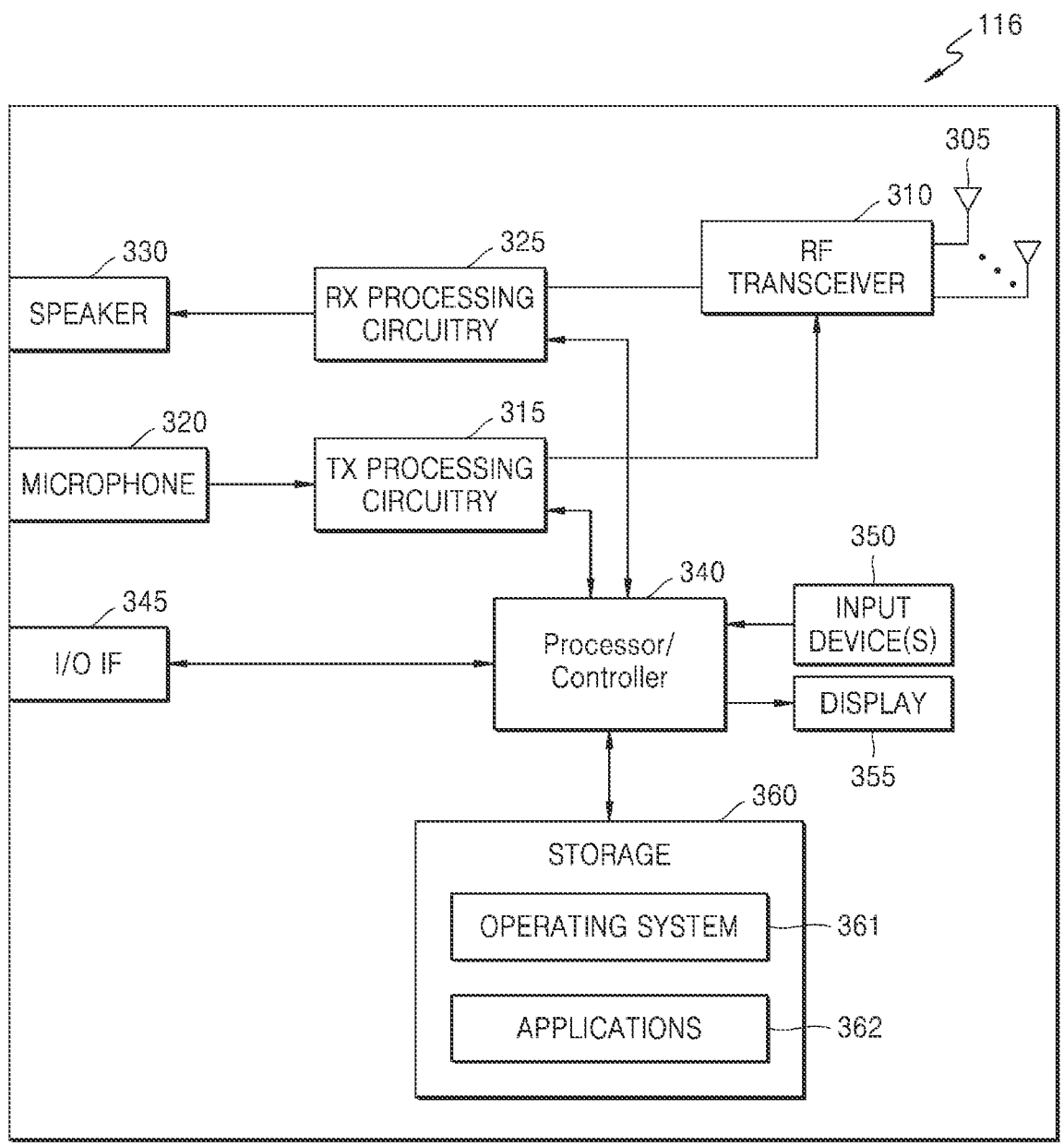
FIG. 3A illustrates a UE according to an embodiment.

FIG. 3A illustrates a UE 116 according to an embodiment. In FIG. 3A, UE 116 is an example, and UEs 111-115 of FIG. 1 can have the same or similar configuration. However, a UE has various configurations, and FIG. 3A does not limit the scope of the disclosure to any specific implementation of the UE.

UE 116 includes an antenna 305, an RF transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325 which generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. The processor/controller 340 includes at least one microprocessor or microcontroller.

The processor/controller 340 is also capable of executing other processes and programs residing in the memory 360, such as operations for channel quality measurement and reporting for systems with 2D antenna arrays as described herein. The processor/controller 340 can move data into or out of the memory 360 as required by an execution process. The processor/controller 340 is configured to execute the application 362 based on the OS 361 or in response to signals received from the gNB or the operator. The processor/controller 340 is also coupled to an I/O interface 345 which provides UE 116 with the ability to connect to other devices such as laptop computers and handheld computers. The I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. For example, the processor/controller 340 can be divided into a plurality of processors, such as one or more central processing units (CPUs) and one or more graphics processing units (GPUs). Although FIG. 3A illustrates that the UE 116 is configured as a mobile phone or a smart phone, UEs can be configured to operate as other types of mobile or fixed devices.

Figure 6:
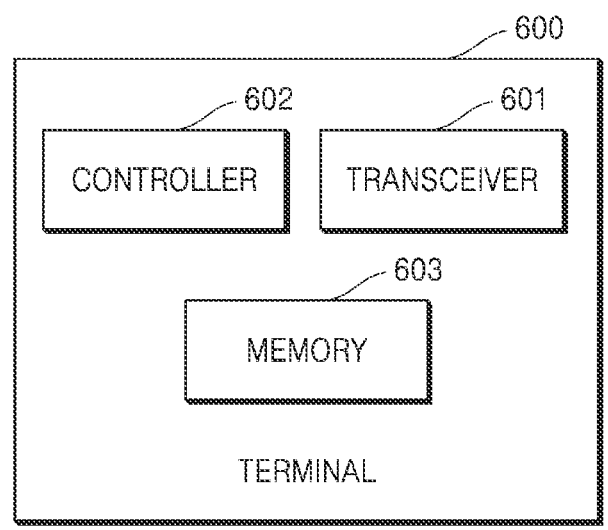
FIG. 6 illustrates a block diagram of a configuration of a terminal according to an embodiment.

The UE illustrated in FIG. 3A may correspond to the terminal 600 illustrated in FIG. 6. The transceiver 601 of the terminal 600 may comprise the RF transceiver 310, the TX processing circuit 315 and a RX processing circuit 325, or perform the operations performed by the RF transceiver 310, the TX processing circuit 315 and a RX processing circuit 325. The controller 602 of the terminal 600 may comprise the processor/controller 340, or perform the operations performed by the processor/controller 340.

Figure 3B:
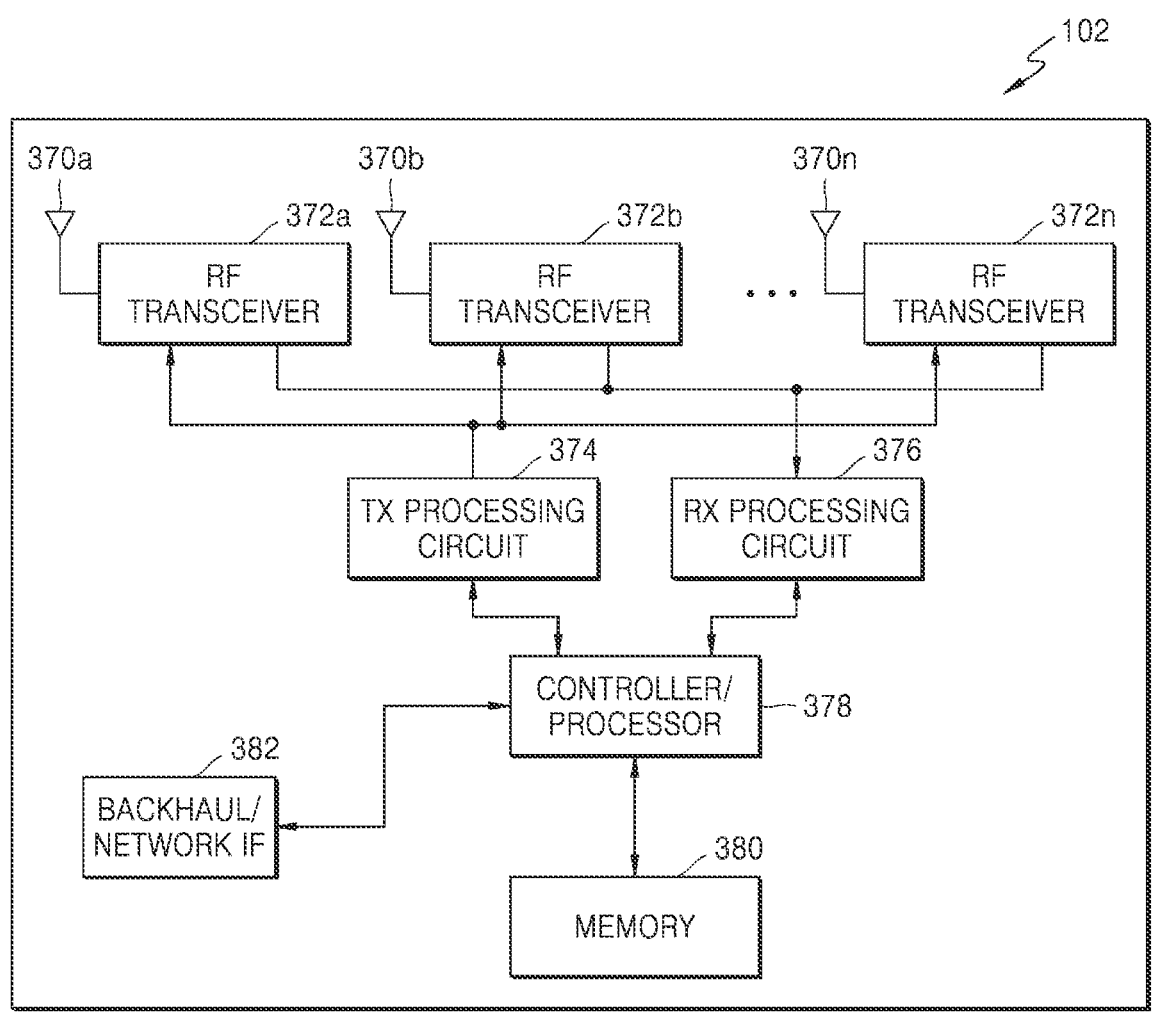
FIG. 3B illustrates a gNB according to an embodiment.

FIG. 3B illustrates a gNB 102 according to an embodiment. The gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. One or more of the plurality of antennas 370a-370n include a 2D antenna array. gNB 102 also includes a controller/processor 378, a memory 380, and a backhaul or network interface 382.

The RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm and decode a received signal from which an interference signal is subtracted. A controller/processor 378 may support any of a variety of other functions in gNB 102. The controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described herein. The controller/processor 378 supports communication between entities such as web real-time communications (RTCs). The controller/processor 378 can move data into or out of the memory 380 as required by an execution process.

The controller/processor 378 is also coupled to the backhaul or network interface 382. The backhaul or network interface 382 enables gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can enable gNB 102 to communicate with other gNBs through wired or wireless backhaul connections. When gNB 102 is implemented as an access point, the backhaul or network interface 382 can enable gNB 102 to communicate with a larger network, such as the Internet, through a wired or wireless local area network or through a wired or wireless connection.

The back-haul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. A plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with frequency division duplex (FDD) cells and time division duplex (TDD) cells.

Although FIG. 3B illustrates an example of gNB 102, various changes may be made to FIG. 3B. For example, gNB 102 can include any number of each component shown in FIG. 3A. The access point can include a plurality of back-haul or network interfaces 382, and the controller/processor 378 can support routing functions to route data between different network addresses. Although shown as including a single instance of the TX processing circuit 374 and a single instance of the RX processing circuit 376, gNB 102 can include multiple instances of each (such as one for each RF transceiver).

Figure 4:
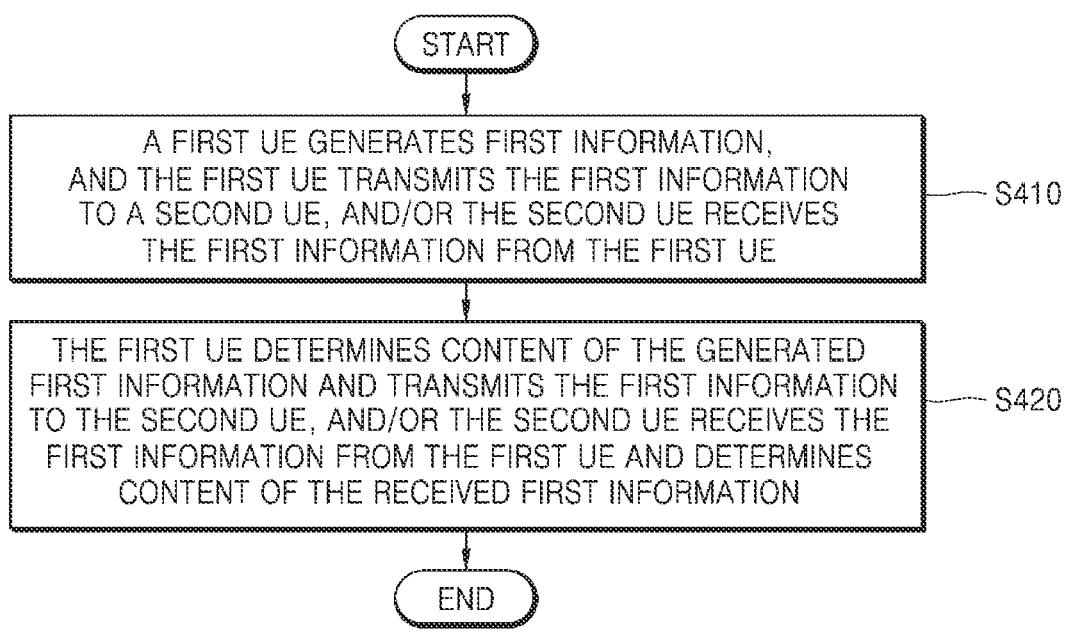
FIG. 4 illustrates a UE coordination method according to a first embodiment.

FIG. 4 illustrates a UE coordination method according to a first embodiment.

At S410, a first UE generates first information, and the first UE transmits the first information to a second UE, and/or the second UE receives the first information from the first UE. The first information is used, at the second UE, as reference information for selecting resources, and/or the second UE selects the resources according to the first information.

Content of the first information includes at least one content of the following:

resources preferred by the first UE, further including resources available to the first UE for sidelink transmission and/or reception, and/or resources available to the second UE for sidelink transmission and/or reception, and/or resources available for transmission and/or reception between the first UE and the second UE, resources not preferred by the first UE, further including resources not available to the first UE for sidelink transmission and/or reception, and/or resources not available to the second UE for sidelink transmission and/or reception, and/or resources not available for transmission and/or reception between the first UE and the second UE, a channel sensing result from the first UE, transmission parameters preferred by the first UE, further including transmission parameters available to the first UE for sidelink transmission and/or reception, transmission parameters available to the second UE for sidelink transmission and/or reception, and/or transmission parameters available for transmission and/or reception between the first UE and the second UE, and transmission parameters not preferred by the first UE, further including transmission parameters not available to the first UE for sidelink transmission and/or reception, and/or transmission parameters not available to the second UE for sidelink transmission and/or reception, and/or transmission parameters not available for transmission and/or reception between the first UE and the second UE.

The above resources include at least one of a resource pool, time-domain resources, frequency-domain resources and code-domain resources. Specifically, the time-domain resources include slots and/or symbols, the frequency-domain resources include RBs and/or subchannels, and the code-domain resources include at least one of specific sequences, parameters used to generate sequences, cyclic shifts of sequences, sequences used for scrambling (e.g., radio network temporary identifier (RNTI)), and reference signal patterns. Specifically, the resource pool includes at least one of: an index of the resource pool, all or part of configurations of the resource pool, and available resources in the resource pool including locations and/or sizes of the resources.

The above transmission parameters include at least one of: a number/size of subchannels, a cycle of transmission, a resource pool for transmission (which may be indicated by an index), transport block size (TBS), modulation coding scheme (MCS), a channel state information reference signal (CSI-RS) configuration (e.g., whether the CSI-RS is enabled in transmission), a demodulation reference signal (DMRS) configuration (e.g., DMRS pattern), a power control configuration, IDs and/or a number of HARQ processes, a priority, a cast type (e.g., unicast/groupcast/broadcast).

If the content of the first information includes the resources preferred by the first UE and/or the resources not preferred by the first UE, at least one of the above information related to resources is indicated in the first information, and further, a position and/or size corresponding to the at least one information is indicated. For example, indices of slots not preferred by the first UE and subchannel indices and/or subchannel sizes preferred by the first UE are indicated in the first information.

The resources not preferred by the first UE further include: resources used for transmission and/or reception with other UEs except for the second UE or resources used for transmission and/or reception with a base station, which are determined by the first UE.

The reliability of sidelink transmission and the utilization efficiency of sidelink resources are improved by generating and transmitting the first information that may include a plurality of different types of resources and/or transmission parameters to the second UE by the first UE.

In some implementations, the content of the first information corresponds to at least one of the following transmission and/or reception:

at least one previous transmission and/or reception of the first UE, at least one previous transmission and/or reception of the second UE, at least one subsequent transmission and/or reception of the first UE, and at least one subsequent transmission and/or reception of the second UE.

The content of the first information corresponds to resources and/or transmission parameters used for the above at least one transmission and/or reception.

Resources used for previous transmission/reception include resources used for transmission/reception before a time point of transmission of the first information; resources used for subsequent transmission/reception include resources used for transmission/reception after the time point of transmission of the first information, and further include resources indicated in sidelink control information SCI which are used for a PSSCH associated with the SCI, and/or resources indicated in sidelink control information SCI which are reserved for other subsequent transmission. The resources indicated in the sidelink control information SCI which are reserved for other subsequent transmission further include resources reserved in a cycle in which the SCI is located and resources reserved in at least one cycle after the cycle in which the SCI is located. Transmission parameters used for previous/subsequent transmission/reception are similar, so the above resources may be replaced with transmission parameters, and the description thereof will not be repeated.

The above transmission includes initial transmission and/or retransmission of a certain TB. Accordingly, the above reception includes reception of initial transmission and/or reception of retransmission of a certain TB.

The content of the first information includes resources not preferred by the first UE, specifically, resources that the first UE determines to use for transmission with a third UE; and the resource corresponds to at least one subsequent transmission/reception of the first UE. A specific example is that the resources are reserved for transmission with the third UE indicated by the first UE or the third UE in the SCI.

An advantage herein is that the content of the first information may include a plurality of different types of resources/parameters, so that the UE may flexibly select appropriate first information in different transmission situations, which increases the flexibility of UE coordination.

After the first UE generates, at step S410, the first information and transmitting the first information to the second UE and/or the second UE receiving the first information from the first UE, at S420, when a first condition is satisfied, the first UE determines content of the generated first information and transmits the first information to the second UE, and/or the second UE receives the first information from the first UE and determines content of the received first information, according to at least one of:

a second condition that triggers the generating/receiving of the first information, an identity of a UE that transmits and/or receives the first information, a number or value of certain content of the generated first information, a manner in which the first information is received/transmitted, a cast type of transmission corresponding to the first information and/or whether the transmission is retransmission, an indication of the content of the first information, and a (pre)configured/(pre)defined fourth condition.

In some implementations, the first condition includes at least one of t:

there is no condition, that is, the first UE always needs to determine the content of the generated first information, and/or the second UE always needs to determine the content of the received first information, the first UE determines the content of the generated first information, and/or the second UE determines the content of the received first information, when the first UE and/or the second UE are (pre)configured/(pre)defined to enable or support more than one of the content of the first information, and/or the content of the first information corresponds to more than one of the above transmission and/or reception (for example, corresponding to resources and/or transmission parameters used for the above more than one transmission and/or reception); otherwise, there is no need to perform this determination, and the first UE and/or the second UE are (pre)configured/(pre)defined to be required to determine the content of the generated/received first information. For example, when the first UE/second UE is configured by RRC to enable specific characteristics, it is required to determine the content of the generated/received first information.

The flexibility of UE configurations is improved by determining the content of the first information under the first condition.

Generating/receiving of the first information is triggered when the second condition is satisfied. The second condition that triggers the generating/receiving of the first information include at least one of the first information being generated/received periodically and/or semi-statically, generating/receiving of the first information being triggered when a configured third condition is satisfied, and generating/receiving of the first information being triggered by specific signaling (e.g., designated signaling).

The first information is generated/received periodically and/or semi-statically, including the first information being generated by the first UE according to first parameters configured by RRC and/or MAC and/or received by the second UE according to the first parameters configured by RRC and/or MAC. The first parameters include at least one of: a cycle, a time-domain starting position, a time-domain size and/or duration, a time-domain ending position, a time-domain offset from a specific reference point (e.g., an offset from subframe number (SFN)=0, e.g., an offset from a time-domain starting position), a frequency-domain starting position, a frequency-domain size and/or duration, a frequency-domain ending position, a frequency-domain position (e.g., a subchannel indicated by a bitmap).

Generating/receiving the first information is triggered when the configured third condition is satisfied, including that the first UE and/or the second UE acquire (pre)configured/(pre)defined second parameters, and when the second parameters satisfy a specific threshold range or belong to a specific set, it is considered that the configured third condition is satisfied and the generating/receiving of the first information is triggered. The second parameters may be predefined in a protocol or configured by MAC/RRC, and include at least one of: a cast type (e.g., unicast/groupcast/broadcast), a service priority (which may be determined by a priority domain of a physical layer and/or QoS domain of a higher layer), an identity of the first UE and/or the second UE (including a UE ID, an ID of the UE within a group, a group ID of the UE), and channel busy ratio (CBR) of a resource pool.

Generating/receiving the first information is triggered by specific signaling, which includes specific signaling from the UE and/or the base station.

The first UE determining the content of the generated first information and/or the second UE determining the content of the received first information according to the second condition includes at least one of:

determining the content of the first information according to whether the generating (or transmitting)/receiving of the first information is triggered by the second condition, determining the content of the first information according to specific content of the second condition that triggers the generating (or transmitting)/receiving of the first information (for example, which of the above multiple second conditions is the second condition), and determining the content of the first information according to information indicated in the second condition that triggers the generating (or transmitting)/receiving of the first information.

The information indicated in the second condition that triggers generating/receiving the first information includes information indicated in specific signaling which is used to determine the content of the first information when the generating/receiving of the first information is triggered by the specific signaling.

For example, when the first information is generated/received periodically and/or semi-statically, the content of the first information includes the channel sensing result from the first UE (and/or the resources preferred by the first UE). The first UE is configured or preconfigured by the base station to periodically transmit the first information, when the first UE generates the periodically transmitted first information, it determines that its content is the channel sensing result from the first UE. The second UE is configured or preconfigured by the base station to periodically receive the first information, and/or the second UE determines that the first UE is configured or preconfigured by the base station to periodically transmit the first information according to (pre)configured information, when the second UE receives the periodic first information, it determines that its content is the channel sensing result from the first UE.

When generating/receiving the first information is triggered by the specific signaling, the content of the first information includes the resources preferred by the first UE. The content of the first information includes the resources available to the second UE for sidelink transmission and/or reception; accordingly, the first information may be understood as scheduling information that the first UE schedules transmission resources for the second UE. The second UE transmits the specific signaling for requesting the first information to the first UE, and the first UE is triggered to transmit the first information after receiving the specific signaling; and when the first UE generates the first information, since the generating of the first information is triggered by the specific signaling, it determines that its content is the resources preferred by the first UE. Accordingly, when the second UE receives the first information, since the generating of the first information (at the first UE) is triggered by the specific signaling, it determines that its content is the resources preferred by the first UE.

When the generating/receiving of the first information is triggered by the specific signaling, the content of the first information is determined according to information indicated in the specific signaling that triggers the generating/receiving of the first information. The second UE transmits the specific signaling for requesting the first information to the first UE, and the content of the first information is indicated in the specific signaling (for example, the specific signaling indicates that the first information needs to include the resources preferred by the first UE); the first UE is triggered to transmit the first information after receiving the specific signaling, and the first UE/second UE accordingly determines the content of the generated/received first information according to the content of the first information indicated in the specific signaling. For example, the first UE determines that the content of the generated first information includes the resources preferred by the first UE according to an indication in the received specific signaling. Accordingly, the second UE determines that the content of the received first information includes the resources preferred by the first UE according to the indication in the transmitted specific signaling. The second UE determines that the content of the received first information corresponding to the specific signaling includes the resources preferred by the first UE according to the indication in the transmitted specific signaling.

Accordingly, different content may be determined for the first information in different communication scenarios according to trigger conditions, thereby enhancing applicability of UE coordination. A part of the trigger conditions is not needed to be explicitly indicated in signaling, which may reduce signaling overhead.

Determining the content of the first information according to the information indicated in the second condition that triggers the generating (or transmitting)/receiving of the first information includes determining which content or contents of the above at least one content are included in the content of the first information and/or a rang and/or specific value of the content of the first information, according to the information indicated in the second condition that triggers the generating (or transmitting)/receiving of the first information.

Accordingly, the information indicated in the second condition that triggers generating (or transmitting)/receiving the first information may include which content or contents of the above at least one content are included in expected content of the first information, and/or a range and/or specific value of the expected content of the first information. The information indicated in the second condition that triggers the generating (or transmitting)/receiving of the first information may also include resources and/or transmission parameters preferred and/or not preferred by the second UE. When the second UE triggers the first UE to generate (or transmit) the first information because it needs to perform sidelink transmission, the information indicated in the second condition may be determined based on the sidelink transmission that the second UE need to perform.

When generating/receiving the first information is triggered by the specific signaling, the information indicated in the second condition that triggers the generating (or transmitting)/receiving of the first information includes the information indicated in the specific signaling.

The range of the content of the first information includes at least one of a starting position of resources indicated in the first information, an ending position of resources indicated in the first information, a range or duration of resources indicated in the first information, and a size or granularity of resources indicated in the first information. The resources may also be replaced by channel sensing results or transmission parameters. The location/range/duration of the resources/sensing results indicated in the first information includes a location/range/duration of time domain and/or frequency domain and/or code domain.

When the information indicated in the second condition that triggers generating (or transmitting)/receiving the first information includes the range and/or specific value of the expected content of the first information, the information may be explicitly or implicitly indicated by indicating the range and/or specific value of the content of the first information with a specific domain in the second condition. The implicitly indicating includes determining the range and/or specific value of the content of the first information according to a relationship between reference signaling and the first information and information of the reference signaling. The reference signaling includes at least one of signaling that carries the first information, the specific signaling in the second condition that triggers the generating (or transmitting)/receiving of the first information, and transmission signaling corresponding to the first information.

The relationship between the reference signaling and the first information may be (pre)configured/(pre)defined, for example, configured by the base station through RRC; and/or indicated by a specific domain in the second condition. The transmission signaling corresponding to the first information also includes: data transmitted by the second UE to the first UE, further including initial transmission or retransmission of a PSSCH (and/or an associated PSCCH) transmitted by the second UE to the first UE, and/or data transmitted by the first UE to the second UE, further including initial transmission or retransmission of a PSSCH (and/or an associated PSCCH) transmitted by the first UE to the second UE. The data transmitted by the second UE to the first UE may be a PSSCH (PSCCH) transmitted within a specific time window or at a specific time point before the first information.

If there is an association between the first information and HARQ-ACK feedback of sidelink data, the data transmitted by the second UE to the first UE may also be a PSSCH (PSCCH) corresponding to the HARQ-ACK feedback associated with the first information. The data transmitted by the first UE to the second UE is similar, and the description will not be repeated.

The second UE transmits the specific signaling for requesting the first information to the first UE. The specific signaling indicates that the content of the first information expected by the second UE includes the channel sensing result from the first UE, that the expected channel sensing result is a channel sensing result within a range of slots and a range of subchannels, and that the expected channel sensing is performed on every M subchannels in every N slots, that is, a resource granularity of the expected channel sensing is N slots and M subchannels (M, N are indicated in the specific signaling). a, b, c, d and N are real numbers or positive infinity/negative infinity. In other embodiments, M and N may also be (pre)configured/(pre)defined.

For example, the second UE transmits the specific signaling for requesting the first information to the first UE. The specific signaling indicates that the content of the first information expected by the second UE includes the channel sensing result from the first UE, that the expected channel sensing result is a channel sensing result within a range of slots and a range of subchannels, and that the expected channel sensing is performed on each subchannel in each slot, that is, the resource granularity of the expected channel sensing is 1 slot and 1 subchannel. a, b, c and d are real numbers or positive infinity/negative infinity. At least one of a, b, c and d is indicated in the specific signaling, and/or at least one of a, b, c and d is (pre)defined/(pre)configured.

For example, the second UE transmits the specific signaling for requesting the first information to the first UE. The specific signaling indicates that the content of the first information expected by the second UE includes the channel sensing result from the first UE, and that the expected channel sensing result is a channel sensing result within a range of slots [n+n1, n+n1+n2] and a range of subchannels [m+m1, m+m1+m2], wherein slot n and sub-channel m are a slot and sub-channel (or starting/ending sub-channel) used by the specific signaling, and n1, n2, m1 and m2 are real numbers or positive infinity/negative infinity. At least one of n1, n2, m1 and m2 is indicated in the specific signaling; and/or at least one of n1, n2, m1 and m2 is (pre)defined/(pre)configured. In this example, n1 and m1 correspond to a time-frequency offset between the channel sensing result and the specific signaling, and n2 and m2 correspond to a time-frequency duration of the channel sensing result. The starting position and duration of the channel sensing result are indicated, and similarly, in other embodiments, the starting position and ending position, ending position and duration of the channel sensing result may also be indicated, and the specific method is similar to the above.

For example, the second UE transmits the specific signaling for requesting the first information to the first UE. The specific signaling indicates that the content of the first information expected by the second UE includes the channel sensing result from the first UE, and that a time range within which the second UE expects to transmit the sidelink transmission is slots [n1, n2], where n1, n2 are real numbers or positive infinity/negative infinity. The channel sensing result determined by the first UE is within the slots [n1+n1', n2+n2'], where n1' and n2' are real numbers or positive infinity/negative infinity. In this example, at least one of n1' and n2' is a (pre)configured offset, for example, the base station configures n1'=−100 and preconfigures n2'=−2 through RRC. In this example, the first UE determines the time-domain range of the determined channel sensing result by calculating the starting and ending positions of slots. Alternatively, the first UE may also determine the time domain range of the channel sensing result by calculating the starting (or ending) positions of slots and duration, and the specific method of determining the starting positions of slots is similar to this, and the duration may be (pre)configured/(pre)defined or indicated in the specific signaling.

For example, the second UE transmits the specific signaling for requesting the first information to the first UE, and the specific signaling indicates that the content of the first information expected by the second UE includes the channel sensing result from the first UE. The channel sensing result determined by the first UE is periodic, for example, every 10 ms for one cycle; the first UE receives the specific signaling in a N-th cycle, and then transmits the first information containing a channel sensing result of a (N−1)-th cycle. In this example, N−1 may also be replaced by N−M, where M is a (pre)defined/(pre)configured real number.

Accordingly, the first UE may generate the first information more pertinently through the information indicated explicitly or implicitly in the second condition. That is, the first UE generates the first information more suitably for the second UE to use, thus improving the performance of UE coordination.

In the above embodiments, only the channel sensing result is taken as an example, but this method may also be similarly used to indicate resources or transmission parameters preferred/not preferred by the UE, such as to indicate specific resources preferred/not preferred by the UE within the time-frequency resource range determined by the above method, or to indicate specific transmission parameters preferred/not preferred within the transmission parameter range determined by the above method.

The first UE generates the first information and determines a resource range corresponding to the content in the first information. For example, a range of the resources preferred/not preferred by the first UE or time-domain resources and/or frequency-domain resources corresponding to a channel sensing range of the first UE in the first information is determined. The method for determining the range includes determining a starting position of the range, determining an offset between the starting position of the range and the reference signaling, determining an ending position of the range, or determining an offset between the ending position of the range and the reference signaling, and determining a duration of the range, including a duration in time domain and/or frequency domain. Any of the above positions or offsets may be (pre)defined/(pre)configured (including, configured by the base station and/or higher layer and/or other UEs), and/or may be dynamically indicated, and/or may be determined based on other parameters.

The dynamically indicating includes dynamically indicating in at least one of the first information, the second condition and the specific signaling triggering the first information, and also includes dynamically indicating by the base station or other UEs through DCI or SCI. The other parameters include at least one of: CBR, QoS, a priority, a cast type, a UE identity, and geographic location information (e.g., zone ID and geographic distance).

The first UE determining the content of the generated first information and/or the second UE determining the content of the received first information according to the identity of the UE that transmits and/or receives the first information includes determining the content of the first information according to a mapping relationship between a specific set of UE identities and the content of the first information. For example, when the identity of the UE that transmits the first information belongs to the specific set, and/or when the identity of the UE that receives the first information belongs to the specific set, it is determined that the content of the first information is content corresponding to the specific set. The specific set is (pre)configured/(pre)defined, for example, configured by the base station through RRC. A typical application scenario is that the first UE only schedules sidelink resources for the second UE in the same group, and at this time, the specific set is a group ID or IDs of respective second UEs within the group. When the second UE is within the group, the first UE provides the second UE with the resources preferred by the first UE.

Accordingly, an application range of UE coordination may be limited, thereby preventing the first UE from providing coordination functions for other UEs which do not request or require the functions. In addition, the identity of the UE is sometimes associated with characteristics of the service, and different content of the first information may be flexibly configured for UEs with different identities, so that the content of the first information is more in line with actual requirements of the service, thereby improving the performance of UE coordination. The method is also easy to implement.

The first UE determining the content of the generated first information and/or the second UE determining the content of the received first information according to the number or value of the certain content of the generated first information includes determining that the certain content is included (or not included) in the first information when the number or value of the certain content of the generated first information satisfies a predetermined threshold interval. For example, when the first UE generates the first information, it is determined that a number of the preferred resources is less than a given threshold, and the resources preferred by the first UE are indicated in the first information. For example, when the first UE generates the first information, it is determined that the number of the preferred resources is greater than the given threshold, then the first information does not indicate the resources preferred by the first UE, but indicates the resources not preferred by it.

The first UE determining the content of the generated first information and/or the second UE determining the content of the received first information according to the number or value of the certain content of the generated first information further includes indicating the content of the first information in the first information after the first UE determines the content of the first information according to the number or value of the certain content of the generated first information. This determination is made because the second UE may not be able to determine the number or value of the certain content of the first information generated at the first UE, and the second UE cannot determine which content(s) the first UE generates. The second UE may determine which content(s) is (are) included in the first information according to the indication.

Accordingly, when only limited information bits may be used to indicate the first information, content which is more suitable to be transmitted in the first information may be selected, and incomplete information of a certain content being transmitted in the first information may be prevented. The method may also reduce overhead of the first information when the information bits are not limited.

The first UE determining the content of the generated first information and/or the second UE determining the content of the received first information according to the manner in which the first information is received/transmitted includes at least one of: determining the content of the first information according to a cast type of the first information, determining according to a type of the signaling that carries the first information, and determining according to the first information and/or the transmission signaling corresponding to the first information being initial transmission or retransmission. The cast type includes at least one of unicast, groupcast and broadcast. The type of the signaling that carries the first information includes at least one of physical layer signaling, MAC layer signaling and RRC layer signaling, and at least one of a specific SCI format, 1st stage or 2nd stage SCI, a specific media access control control element (MAC CE) type, a specific MAC subheader and specific RRC IE.

If the cast type of the first information is unicast, the content of the first information includes the resources preferred by the first UE. If the cast type of the first information is groupcast/broadcast, the content of the first information includes the resources not preferred by the first UE or includes the channel sensing result from the first UE. Accordingly, when the first information is used by a specific second UE, the first UE may play a similar role as a scheduler by indicating the preferred resources. When the first information is used by a plurality of second UEs, it may be difficult to schedule resources for the plurality of second UEs in one piece of first information, and the first UE may indicate the resources that are not preferred, so that the second UE may exclude resources that are not suitable for use and select transmission resources by itself within the remaining large resource range.

When the first information is transmitted in an RRC IE (or MAC CE), the content of the first information includes the channel sensing result from the first UE. When the first information is transmitted in the 2nd stage SCI or a specific 2nd stage SCI format, the content of the first information includes the resources not preferred by the first UE and the transmission parameters preferred by the first UE. When the first information is transmitted in the 1st stage SCI or a specific 1st stage SCI format, the content of the first information includes the resources preferred by the first UE. Accordingly, different signaling as a container of the first information generally has different payload sizes, and this method may enable signaling with a larger payload size to indicate more complete coordination information and signaling with a smaller payload size to indicate a limited number of coordination information. Combined use of a plurality of different signaling types may also enable the UE to quickly obtain the limited coordination information and obtain the more perfect coordination information through higher layer decoding.

The cast type of the transmission corresponding to the first information includes the cast type corresponding to the first information being a specific transmission, when the first information is used for the specific transmission, and/or when the first information is triggered by the specific transmission.

The second UE needs to transmit the sidelink transmission, and in order to acquire resources and/or transmission parameters available for the sidelink transmission, it needs to request the first information from the first UE. The sidelink transmission may be transmitted to the first UE and/or other UEs. The second UE requests the first information from the first UE through the specific signaling, in which the cast type of the sidelink transmission may be indicated. When the sidelink transmission is unicast, the first UE transmits the first information including the resources preferred by the first UE. The first information may be regarded as sidelink scheduling signaling to the second UE, wherein the indicated resources are used for the sidelink transmission of the second UE. Alternatively, the second UE may determine resources for the sidelink transmission based on the resources preferred by the first UE, further combining a channel sensing process of the second UE itself or other methods for selecting sidelink transmission resources.

When the sidelink transmission is groupcast, the first UE transmits the first information including the resources not preferred by the first UE. Based on the resources not preferred by the first UE, the second UE excludes the resources not preferred by the first UE when determining the resources for the sidelink transmission. When the sidelink transmission is groupcast, the second UE requests the first information from a plurality of first UEs (receiver UEs of groupcast may be taken as the plurality of first UEs); each first UE transmits the first information including the resources not preferred by the first UE according to the type of the sidelink transmission being groupcast. When determining the resources for the sidelink transmission, the second UE excludes resources not preferred by each first UE and continues to determine resources specifically for the sidelink transmission in the remaining resources. Accordingly, for a groupcast service with the plurality of receiver UEs, if each receiver UE feeds back resources preferred by itself as the first UE, there may be no intersection between resources fed back by the plurality of receiver UEs. That is, it is difficult for the second UE to select a transmission resource suitable for each first UE, so it is more suitable to feed back the resources not preferred by the first UE in groupcast. For a unicast service, if the first UE feeds back resources preferred by itself, the second UE may directly select resources used for unicast transmission with the first UE in the resources preferred by the first UE, thus simplifying the resource selection process and possibly skipping the channel sensing process of the second UE to reduce power consumption.

The second UE needs to transmit the sidelink transmission, and in order to acquire resources and/or transmission parameters available for the sidelink transmission, the second UE needs to request the first information from the first UE. When the sidelink transmission is an initial transmission, the first UE includes the resources not preferred by the first UE in the first information. When the sidelink transmission is retransmission, the first UE includes the resources preferred by the first UE in the first information. Accordingly, for the initial transmission, the second UE may be provided with a larger space for selecting resources, thereby completing the initial transmission faster. For the retransmission, the second UE may be enabled to select better resources for the first UE, thus improving the reliability of the retransmission. In addition, this method may also be used in combination with the method in the previous embodiment, that is, for the initial transmission of groupcast of the second UE, the first UE provides the first information including the resources that are not preferred. For the retransmission of groupcast of the second UE, it is more likely that only a few first UEs need to receive the retransmission after failing to decode, and the few first UEs may feed back the preferred resources, thereby improving probability of successful retransmission.

Accordingly, the information indicated in the second condition that triggers generating (or transmitting)/receiving the first information may include a first UE that needs to transmit the first information, for example, indicating that a first UE that fails to receive transmission and/or a first UE that transmits non-ACK (NACK) or a first UE that does not transmit an ACK are the first UE that needs to transmit the first information, and for another example, indicating the identity of the first UE; other UEs that satisfy the second condition do not need to transmit the first information.

The first UE that fails to receive the transmission includes a first UE that receives transmission from the second UE (and/or other UEs) and does not perform decoding successfully before detecting the second condition. The first UE that transmits a NACK or the first UE that does not transmit ACK includes receiving transmission from the second UE (and/or other UEs) before detecting the second condition and transmitting a NACK or not transmitting a ACK to the second UE as a HARQ feedback for the transmission. The information indicated in the second condition that triggers the generating (or transmitting)/receiving of the first information may also include whether the transmission corresponding to the first information is retransmission. For example, it includes an explicit or implicit retransmission indication, which is used to indicate that the first information is initial transmission or retransmission, and/or to indicate that the transmission corresponding to the first information is retransmission or retransmission. The information indicated in the second condition that triggers the generating (or transmitting)/receiving of the first information may also include the cast type of the transmission corresponding to the first information, for example, including an indication that the transmission corresponding to the first information is unicast, broadcast or groupcast.

The first UE determining the content of the generated first information and/or the second UE determining the content of the received first information according to the indication of the content of the first information includes at least one of:

the second UE determining content of required first information and indicating the required content to the first UE, the second UE transmitting a first specific signaling triggering message to the first UE, and the second UE indicating the content of the required first information in the specific signaling, and/or the second UE transmitting the first specific signaling triggering message to the base station, and the second UE indicating the content of the required first information in the specific signaling, the first UE determining the content of the generated first information and indicating the required content to the second UE, the first UE indicates the content in the first information, and/or the first UE transmits independent signaling to indicate the content. For example, the first UE indicates the first information in the MAC CE and indicates the content of the first information in a subheader of the MAC CE. For example, the first UE indicates the first information in the 2nd stage SCI, and indicates the content of the first information in the 1st stage SCI, and/or indicates the content of the first information in a specific field of the 2nd stage SCI. For example, the first UE indicates the first information in MAC/RRC signaling and indicates the content of the first information in SCI associated with the PSSCH that carries the MAC/RRC signaling.

The fourth condition includes whether a specific parameter satisfies a threshold range. The specific parameter includes at least one of: CBR, QoS, a physical layer priority (e.g., a priority indicated in SCI), geographic location information (e.g., zone ID, a distance between the first UE and the second UE).

The methods described above may also be combined arbitrarily. For example, generating the first information by the first UE is triggered by the specific signaling from the second UE, and the cast type of the transmission corresponding to the first information is groupcast, and an ID of the second UE belongs to a specific group ID. Thus, it is determined that resources not preferred by the first UE are included in the generated first information.

In the above examples, only resources are taken as examples to illustrate the methods specifically adopted in the disclosure, which may be similarly used for transmitting parameters, and the description will not be repeated.

The above methods may determine more than the determined first information includes both the resources preferred by the first UE and the transmission parameters preferred by the first UE. The more than one of the contents of the first information may be indicated in same signaling. For example, different fields are used to indicate different content of the first information in a same SCI format or same higher layer signaling; and/or the more than one of the contents of the first information may be multiplexed on same resources. For example, different content of the first information is indicated by different RRC IEs and/or MAC CEs, which are transmitted in a same PSSCH. When a size of information bit or a resource size is limited, the UE may preferentially transmit content of first information with a higher priority within a range enabled by the information bit/resource size according to a predetermined priority among different content.

Figure 5:
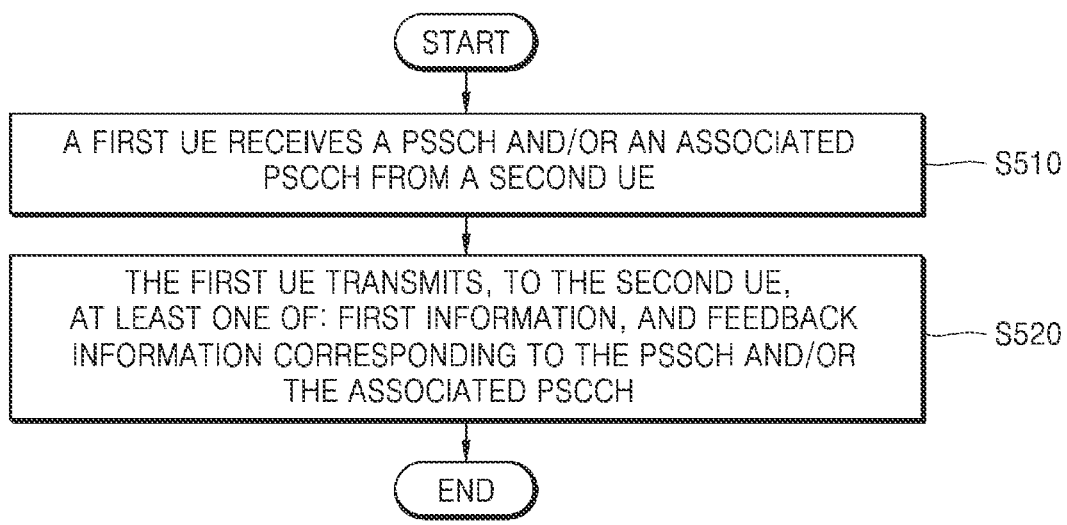
FIG. 5 illustrates a UE coordination method according to a second embodiment.

FIG. 5 illustrates a UE coordination method according to a second embodiment.

In FIG. 5, at S510, a first UE receives a PSSCH and/or an associated PSCCH from a second UE. At S520, after receiving the PSSCH and/or the associated PSCCH, the first UE transmits, to the second UE, at least one of: first information, and feedback information corresponding to the PSSCH and/or the associated PSCCH. The feedback information includes a HARQ-ACK feedback, which may be transmitted in a PSFCH or other physical layer channels.

The methods used in the above embodiments, such as content of the first information, and the manner in which the content of the first information is determined in FIG. 4, may be used in the embodiment of FIG. 5, and the description will not be repeated.

The second condition also includes that the first UE does not successfully receive the PSSCH and/or the associated PSCCH transmitted by the second UE, and/or if content of the feedback information is NACK.

The first UE transmitting the first information to the second UE includes the first UE transmitting the first information to the second UE, if the first UE does not successfully receive the PSSCH and/or the associated PSCCH transmitted by the second UE, and/or if the content of the feedback information is NACK.

The content indicated in the first information and/or the feedback information transmitted by the first UE to the second UE includes at least one of:

resources preferred by the first UE, further including resources preferred by the first UE for receiving retransmission of the second UE, resources not preferred by the first UE, further including resources not preferred by the first UE for receiving retransmission of the second UE, transmission parameters preferred by the first UE, further including transmission parameters preferred by the first UE for receiving retransmission of the second UE, and transmission parameters not preferred by the first UE, further including transmission parameters not preferred by the first UE for receiving retransmission of the second UE.

The reliability of sidelink transmission and the utilization efficiency of sidelink resources are improved by transmitting the first information and/or the feedback information that may include various types of resources and/or transmission parameters to the second UE by the first UE.

If the first UE does not successfully receive the PSSCH and/or the associated PSCCH transmitted by the second UE, and/or if the content of the feedback information is a NACK, the content of the first information may also include a reason for failure of receiving (and/or transmitting NACK). This inclusion is made due to:

a conflict with other sidelink transmission. For example, the first UE detects that the second UE and other UEs reserve same sidelink resources, and does not successfully receive the PSSCH/PSCCH from the second UE on the sidelink resources subsequently, half-duplex, such as the first UE detecting that the second UE reserves a certain sidelink resource, but the first UE needs to perform downlink reception/uplink transmission/sidelink transmission on the resource reserved by the second UE, and accordingly cannot receive transmission of the second UE, or low received power. For example, the first UE detects that received power of the PSSCH and/or PSCCH of the second UE or received power of its reference signal is lower than a threshold or does not satisfy a specific threshold range, wherein the reference signal includes at least one of DMRS, CSI-RS and PT-RS.

The description applicable to the content of the first information in FIG. 4 may also be similarly used in FIG. 5, so the description will not be repeated.

The resources preferred/not preferred by the first UE indicated in the first information and/or the feedback information transmitted by the first UE to the second UE include:

indicating absolute positions of the resources preferred/not preferred by the first UE; for example, indicating an index of a slot, an index of a subchannel, an RB index, or a code domain index such as a cyclic shift/root sequence index, indicating offsets between the resources preferred/not preferred by the first UE and resources of initial transmission of the PSSCH/PSCCH transmitted by the second UE, including an offset of at least one of time domain, frequency domain and code domain, and/or indicating offsets between the resources preferred/not preferred by the first UE and resources of last (or previous k-th (k is a positive integer) transmission of the PSSCH/PSCCH transmitted by the second UE and/or transmission corresponding to the feedback information, including an offset of at least one of time domain, frequency domain and code domain.

The transmission parameters preferred/not preferred by the first UE indicated in the first information and/or the feedback information transmitted by the first UE to the second UE include:

indicating values of the transmission parameters preferred/not preferred by the first UE; for example, multiplexing indication fields in the prior art, indicating offsets between the transmission parameters preferred/not preferred by the first UE and transmission parameters corresponding to initial transmission and/or last (or previous k-th) transmission of the PSSCH/PSCCH transmitted by the second UE and/or transmission of the feedback information, and/or indicating adjustment directions between the transmission parameters preferred/not preferred by the first UE and transmission parameters corresponding to initial transmission and/or last (or previous k-th) transmission of the PSSCH/PSCCH transmitted by the second UE and/or transmission of the feedback information.

The second UE transmits TB-1 to the first UE, and slot n1 and subchannels [m1, m2] are used for a PSSCH and PSCCH of initial transmission of TB-1. The first UE successfully decodes the PSCCH, but does not successfully decode the associated PSSCH, and transmits the first information (or first information and feedback information) to the second UE. Alternatively, resources preferred by the first UE for receiving retransmission of the second UE are indicated in the first information, and specifically, time-domain offset n' and frequency-domain offset m' are indicated it the first information, which are offsets between the resources preferred by the first UE and resources used for initial transmission of TB-1. That is, the resources preferred by the first UE indicated in the first information are slot n1+n', and subchannels [m1+m', m2+m']. Alternatively, transmission parameters preferred by the first UE for receiving retransmission of the second UE are indicated in the first information, and specifically, an MCS offset is indicated in the first information, which may be indicated in at least one of the following manners:

indicating an MCS offset direction. For example, the MCS offset indicated in the first information is forward, and if MCS=10 is used for the initial transmission of TB-1, MCS preferred by the first UE indicated in the first information is any MCS greater than 10. Alternatively, according to a predetermined criterion, the MCS preferred by the first UE indicated in the first information is MCS that is adjusted N states forward, that is, MCS=10+N, and N is a non-negative integer, indicating a specific offset. For example, the MCS offset indicated in the first information is −2, and if MCS=10 is used for the initial transmission of TB-1, the MCS preferred by the first UE indicated in the first information is 10−2=8. The method may be used in combination with indicating the MCS offset direction. That is, an absolute value of the MCS offset and an adjustment direction of the MCS are indicated in the first information, and/or indicating a range of the offset. For example, the MCS offset indicated in the first information is >5, and if MCS=10 is used for the initial transmission of TB-1, the MCS preferred by the first UE indicated in the first information is any MCS greater than 10+5=15. The method may be used in combination with indicating the MCS offset direction. That is, a range of the absolute value of the MCS offset and the adjustment direction of the MCS are indicated in the first information.

As such, the first UE may transmit the first information after the PSSCH (and/or PSCCH) of the initial transmission of TB-1 is not successfully decoded, or after a PSSCH of any retransmission or N-th retransmission of TB-1 is not successfully decoded. If the first UE transmits the first information after the PSSCH of the N-th retransmission of TB-1 is not successfully decoded, the first information indicates offsets between resources/transmission parameters preferred by the first UE for receiving (N+1)-th retransmission and resources/transmission parameters used for the initial transmission of TB-1.

For example, the second UE transmits TB-1 to the first UE, and slot n1 and subchannels [m1, m2] are used for a PSSCH and PSCCH of the N-th transmission of TB-1. The first UE does not successfully decode the PSSCH and/or PSCCH and transmits the first information (or first information and feedback information) to the second UE. Resources and/or transmission parameters preferred by the first UE for receiving retransmission of the second UE are indicated in the first information, and the indication method is similar to the foregoing embodiment except that the first information indicates offsets between the resources and/or transmission parameters preferred by the first UE for receiving the (N+1)-th retransmission and resources and/or transmission parameters used for the N-th transmission of TB-1.

For example, the second UE transmits TB-1 to the first UE, and slot n1 and subchannels [m1, m2] are used for a PSSCH and PSCCH of the N-th transmission of TB-1. The first UE transmits the first information (or first information and feedback information) to the second UE, and the resources preferred by the first UE for receiving the retransmission of the second UE are indicated in the first information. The indication method is similar to the foregoing embodiments, except that the first information indicates offsets between resources and/or transmission parameters preferred by the first UE for receiving (N+K)-th retransmission and the resources and/or transmission parameters used for the N-th transmission of TB-1. K or a maximum/minimum value of K is (pre)defined/(pre)configured, for example, configured by a base station or the second UE to the first UE through RRC; and/or K is indicated by the first UE to the second UE in the first information.

Accordingly, the first UE, as a receiver of sidelink data, schedules the retransmission of the second UE, as a transmitter of the sidelink data, through the first information. Since the first UE knows better how to properly receive the sidelink data from the first UE, it may be expected that the first UE may obtain improved performance by scheduling the retransmission of the second UE, such as lower block error rate (BLER), than selecting retransmission resources by the second UE itself. The method may also apply coordination between UEs to a typical scenario of a transmitter/receiver of the sidelink data, which not only optimizes the performance of the typical scenario by using targeted methods, but also simplifies conditions and methods of UE coordination, thereby simplifying implementation.

In this embodiment, the first UE transmitting the first information to the second UE includes transmitting in at least one of the following manners:

indicating the first information in SCI, i.e., in a specific SCI format and a specific stage SCI; for example, 2nd stage SCI format in the prior art is 0-2, and the first information is indicated in a new 2nd stage SCI format 0-2A, indicating the first information in a PSSCH by higher layer signaling (such as MAC CE, MAC header/sub-header, RRC signaling), which is transmitted in the PSSCH. Alternatively, there is a (pre)configured/(pre)defined relationship between resources used for transmitting the first information and resources used for a PSSCH/PSCCH corresponding to the first information, and accordingly, after transmitting the PSCCH/PSSCH to the first UE, the second UE receives the first information within a certain resource range according to the (pre)configured/(pre)defined relationship. For example, the first UE transmits the first information in slots [n+n1, n+n2] after receiving the PSSCH/PSCCH from the second UE in slot n. Thus, the second UE detects the first information from the first UE in slots [n+n1, n+n2] after transmitting the PSSCH/PSCCH to the first UE in slot n; n1 and n2 are non-negative integers configured by the base station through RRC, and/or indicating the first information in the PSFCH.

The first UE transmitting the first information and/or the feedback information corresponding to the PSSCH and/or the associated PSCCH to the second UE includes:

discontinuing the transmitting of the feedback information, if the first UE transmits the first information to the second UE; specifically, the transmitting of a HARQ-ACK feedback corresponding to the PSSCH and/or the associated PSCCH is discontinued, and/or transmitting the feedback information in the first information, if the first UE transmits the first information to the second UE, and specifically, transmitting the HARQ-ACK feedback corresponding to the PSSCH and/or the associated PSCCH.

A method for carrying the feedback information in the first information includes at least one of:

multiplexing the first information and the feedback information on same resources; for example, when the first information is transmitted through the PSSCH, the feedback information is transmitted on the PSSCH. That is, the feedback information is mapped on a specific RE of the PSSCH, and the PSSCH on the RE is punctured or the PSSCH is rate matched around the RE; for example, when the first information is transmitted through the PSSCH, a scrambling sequence is generated based on the feedback information and the PSSCH is scrambled with the sequence, and/or multiplexing the first information and the feedback information in a same PSSCH; for example, when the first information is transmitted through a MAC CE, the first information and the feedback information are indicated in different MAC CEs respectively, and the two MAC CEs are indicated in the same PSSCH; similarly, they may also be indicated in different RRC IEs.

Alternatively, a condition for carrying the feedback information in the first information includes at least one of:

a receiver of the first information and a receiver of the feedback information being a same UE, the first information and the feedback information corresponding to a same PSSCH and/or PSCCH, transmission resources of the first information and transmission resources of the feedback information (e.g., feedback information determined according to the existing mechanism) satisfying a predetermined relationship. For example, it is assumed that a corresponding PSSCH and PSCCH are transmitted in slot n, and transmission resources of the feedback information determined according to the prior art are in slot n+k, if the first information is transmitted between slots [n+k−x1, n+k+x2], the first information may carry the feedback information, otherwise, the first information and the feedback information need to be transmitted with independent signaling.

Thus, the timeliness of the feedback information may be ensured through the predetermined relationship, and/or a payload size of the feedback information satisfying a specific threshold range, and/or a number of HARQ processes or PSSCHs corresponding to the feedback information satisfying a specific threshold range. For example, when the feedback information does not exceed 2 bits, the feedback information may be transmitted in the first information; for example, when the feedback information is feedback information of a single PSSCH (or the number of HARQ processes=1) instead of a HARQ-ACK codebook (or a number of HARQ-ACK processes>1), the feedback information may be transmitted in the first information. Thus, degraded performance of the first information when the PSSCH of the first information transmits too many information bits of the feedback information may be avoided, a cast type of at least one of the first information, a PSSCH and/or PSCCH corresponding to the first information, and a PSSCH and/or PSCCH corresponding to the feedback information being a specific cast type. For example, only for unicast, the feedback information may be transmitted in the first information, and/or a type of the HARQ-ACK feedback being a specific type. For example, only for groupcast HARQ feedback option 2 (an option that a receiver UE needs to feed back both an ACK and a NACK), the feedback information may be transmitted in the first information.

When transmitting the feedback information in the first information, the method may also be used to further expand the payload size of the feedback information that can be transmitted by the UE, so that the UE can transmit more complete information, instead of being limited by a size of the PSFCH and only feeding back 1 bit for each PSSCH as in the prior art.

Alternatively, when the feedback information transmitted in the first information is generated, the feedback information includes HARQ-ACK codebooks corresponding to one or more PSSCH receptions; and/or it includes HARQ-ACK codebooks corresponding to one or more transmitter UEs.

Alternatively, a method for generating the feedback information transmitted in the first information includes, if a PSSCH corresponding to the feedback information is groupcasted, and/or the first information corresponds to groupcast, and/or the first information is transmitted to a certain UE group by groupcast, and/or an identity of a UE group (e.g., a target ID corresponding to the UE group) is indicated in the first information: generating the feedback information based on a configuration of the groupcast or the identity of the group. Alternatively, the feedback information may be generated in a form of a HARQ-ACK codebook, wherein bits of the codebook correspond to members in the UE group.

The first information is transmitted to a certain UE group by groupcast (in the prior art, transmitting by groupcast is implemented by indicating a target ID corresponding to groupcast in SCI), and/or the identity of the UE group is indicated in the first information (e.g., the target ID corresponding to the UE group). It is assumed that the UE group has N members, the first UE generates feedback information (codebook) with a length of N bits, in which the first bit corresponds to a member with an ID within the group of 0, and the second bit corresponds to a member with an ID within the group of 1. Alternatively, it is assumed that an ID within the group of the first UE is m, after generating the feedback information, the first UE deletes a bit corresponding to itself, i.e., a (m+1)-th bit, and generates feedback information with a length of N−1 bits, to further reduce the overhead. In this example, the ID within the group is calculated from 0, and similarly, this method may also be used when the ID within the group is calculated from 1 or other values.

The method for generating the feedback information in this method may also be used independently. That is, when the feedback information is not transmitted in the first information, the above method for generating the feedback information is still applicable.

Accordingly, for a sidelink UE group, when members within the group receive the first information, they may also receive the feedback information provided by the first UE that transmits the first information, so that the first UE may discontinue transmission of the feedback information independently to the members within the group, thus reducing the overhead of feedback signals and reducing the burden of transmitting multiple PSFCHs by the UE. In addition, if a time point at which the UE transmits the first information is earlier than a time point at which the feedback information is independently transmitted to the members within the group determined according to the prior art, the delay of the sidelink transmission may also be reduced.

FIG. 6 illustrates a block diagram of a terminal according to an embodiment.

The UE described above may correspond to the terminal 600. For example, the first UE and/or the second UE described above may correspond to the terminal 600. For example, the UE illustrated in FIG. 3A may correspond to the terminal 600.

Referring to FIG. 6, a terminal 600 may include a transceiver 601, a controller 602, and a memory 603. For example, the transceiver 601 may be configured to transmit and receive signals. The controller 602 may be coupled to the transceiver 601. The memory 603 may store instructions executable by the processor 602 that, when executed by the processor 602, cause the processor 602 to perform the aforementioned methods.

The transceiver 601 may include a RF transmitter for up-converting and amplifying a transmitted signal, and a RF receiver for down-converting a frequency of a received signal. However, according to another embodiment, the transceiver 601 may be implemented by fewer or additional components than those illustrated in components.

The transceiver 601 may be connected to the controller 602 and transmit and/or receive a signal. The signal may include control information and data. In addition, the transceiver 601 may receive the signal through a wireless channel and output the signal to the controller 602 0. The transceiver 601 may transmit a signal output from the controller 602 through the wireless channel.

The controller 602 may include one or more processors or other processing devices that control the proposed function, process, and/or method. Operation of the terminal 600 may be implemented by the controller 602.

The controller 602 may generate first information and control the transceiver 601 to transmit the first information to another terminal, wherein the first information is used, at the other terminal, as reference information for selecting resources. The content of the first information may include at least one content of resources preferred by the terminal, resources not preferred by the terminal, a channel sensing result from the terminal, transmission parameters preferred by the terminal, and transmission parameters not preferred by the terminal.

The memory 603 may store the control information or the data included in a signal obtained by the terminal 600. The memory 603 may be connected to the controller 602 and store at least one instruction or a protocol or a parameter for the proposed function, process, and/or method. The memory 603 may include read-only memory (ROM) and/or random access memory (RAM) and/or hard disk and/or CD-ROM and/or DVD and/or other storage devices.

Although the terminal is illustrated as having separate functional blocks for convenience of explanation, the configuration of the terminal 600 is not limited thereto. For example, the terminal 600 may include a communication unit consisting of a transceiver and a processor. The terminal 600 may communicate with at least one network node by means of the communication unit.

At least part of the apparatus (e.g., modules or functions thereof) or the method (e.g., operations) according to various embodiments of the disclosure may be implemented by an instruction which is stored in a computer-readable storage medium (e.g., the memory) in a form of a program module. When executed by a processor or controller, the instruction may enable the processor or controller to perform corresponding functions. The computer-readable medium may include, for example, a hard disk, a floppy disk, a magnetic media, an optical recording media, a DVD, a magneto-optical media, and the like. The instructions may include a code made by a compiler or a code which can be executed by an interpreter. The module or apparatus according to various embodiments of the disclosure may include at least one or more of the aforementioned elements, some of the aforementioned elements may be omitted, or may further include other additional elements. Operations executed by the module, program module, or other elements according to various embodiments of the disclosure may be executed sequentially, in parallel, repeatedly, or in a heuristic way. Alternatively, at least some operations may be executed in a different order or may be omitted, or other operations may be added.

Those skilled in the art may understand achieving all or a portion of the steps performed by the methods described above may be accomplished through commanding the associated hardware by a program, the program may be stored in a computer readable storage medium, when it is executed, one of the steps of the method embodiments or a combination thereof is included.

In addition, the functional units in the embodiments may be integrated in a processing module, or each unit may be physically present individually, or two or more units may be integrated in one module. The integrated module may be implemented in the form of hardware and may also be achieved in the form of software function modules. The integrated module may also be stored in a computer-readable storage medium if it is implemented in the form of a software function module and is sold or used as a standalone product.

In some implementations, the method further comprises: receiving, by the first UE, a physical sidelink shared channel (PSSCH) and/or an associated physical sidelink control channel (PSCCH) from the second UE; and transmitting, by the first UE to the second UE after receiving the PSSCH and/or the associated PSCCH, at least one of: the first information; and feedback information corresponding to the PSSCH and/or the associated PSCCH, wherein content indicated in the feedback information includes at least one of: HARQ-ACK feedback corresponding to the PSSCH and/or the associated PSCCH; resources preferred by the first UE; resources not preferred by the first UE; a channel sensing result from the first UE; transmission parameters preferred by the first UE; and transmission parameters not preferred by the first UE.

In some implementations, the content of the first information corresponds to at least one of the following transmission and/or reception: a previous transmission and/or reception of the first UE; a previous transmission and/or reception of the second UE; a subsequent transmission and/or reception of the first UE: and a subsequent transmission and/or reception of the second UE.

In some implementations, the generating of the first information is triggered when a second condition is satisfied, and wherein the second condition includes at least one condition of the following conditions: the first information being generated periodically and/or semi-statically; the generating of the first information being triggered when a configured third condition is satisfied; and the generating of the first information being triggered by predetermined signaling.

In some implementations, the generating of the first information by the first UE and the transmitting of the first information to the second UE by the first UE comprises: when a first condition is satisfied, determining, by the first UE, content of the generated first information and transmitting the first information to the second UE according to at least one of: a second condition that triggers the generating of the first information; an identity of a UE that transmits and/or receives the first information; a number or value of certain content of the generated first information; a manner in which the first information is transmitted; a cast type of transmission corresponding to the first information and/or whether the transmission is retransmission; an indication of the content of the first information; and a configured or defined fourth condition.

In some implementations, the first condition includes at least one of: the first UE always needing to determine the content of the generated first information; the first UE and/or the second UE being configured or defined to enable or support more than one of the content of the first information, and/or the content of the first information corresponding to more than one of the transmission and/or reception; and the first UE being configured or defined to be required to determine the content of the generated first information.

In some implementations, the determining of the content of the generated first information by the first UE according to the second condition comprises at least one of: determining the content of the first information according to whether the generating of the first information is triggered by the second condition; determining the content of the first information according to which one of the at least one condition the second condition is; and determining the content of the first information according to information indicated in the second condition.

In some implementations, the information indicated in the second condition includes information indicated in the predetermined signaling for determining the content of the first information when the generating of the first information is triggered by the predetermined signaling.

In some implementations, the determining of the content of the first information according to the information indicated in the second condition comprises: determining which content or contents of the at least one content are included in the content of the first information, and/or determining a range and/or value of the content of the first information, according to the information indicated in the second condition.

In some implementations, the information indicated in the second condition includes: which content or contents of the at least one content are included in expected content of the first information, and/or a range and/or value of the expected content of the first information.

In some implementations, the information indicated in the second condition includes resources and/or transmission parameters preferred and/or not preferred by the second UE.

In some implementations, the information indicated in the second condition is determined based on sidelink transmission that the second UE needs to perform, when the second UE triggers the first UE to generate or transmit the first information because it needs to perform the sidelink transmission.

In some implementations, the information indicated in the second condition is indicated explicitly or implicitly when the information indicated in the second condition includes the range and/or value of the expected content of the first information, wherein indicating implicitly includes determining a range and/or value of the content of the first information according to a relationship between reference signaling and the first information and information of the reference signaling, wherein the reference signaling includes at least one of: signaling that carries the first information; the predetermined signaling in the second condition; and transmission signaling corresponding to the first information, wherein a relationship between the reference signaling and the first information is configured or defined, and/or indicated with a specific domain in the second condition, and wherein the transmission signaling corresponding to the first information includes: data transmitted by the second UE to the first UE, including initial transmission or retransmission of the PSSCH and/or the associated PSCCH transmitted by the second UE to the first UE; and/or data transmitted by the first UE to the second UE, including initial transmission or retransmission of the PSSCH and/or the associated PSCCH transmitted by the first UE to the second UE.

In some implementations, the information indicated in the second condition includes a first UE that needs to transmit the first information, and other UEs that satisfy the second condition do not need to transmit the first information.

In some implementations, the determining of the content of the generated first information by the first UE according to the identity of the UE that transmits the first information comprises: determining the content of the first information according to a mapping relationship between a specific set of identities of the UE and the content of the first information.

In some implementations, the determining of the content of the generated first information by the first UE according to the number or value of the certain content of the generated first information comprises: determining to include or not to include the certain content in the first information when the number or value of the certain content of the content of the generated first information satisfies a predetermined threshold interval.

In some implementations, the determining of the content of the generated first information by the first UE according to the manner in which the first information is transmitted comprises at least one of: determining the content of the first information according to a cast type of the first information; determining the content of the first information according to a type of signaling that carries the first information; and determining the content of the first information according to the first information and/or transmission signaling corresponding to the first information being initial transmission or retransmission.

In some implementations, the cast type of the transmission corresponding to the first information includes that: the cast type corresponding to the first information is a cast type of specific transmission, when the first information is used for the specific transmission, and/or when the first information is triggered by the specific transmission.

In some implementations, the determining of the content of the generated first information by the first UE according to the indication of the content of the first information comprises at least one of: receiving, by the first UE, the indication of the content of the first information required by the second UE from the second UE; and determining, by the first UE, the content of the generated first information and indicating the generated content to the second UE.

In some implementations, the fourth condition includes: whether a specific parameter satisfies a threshold range, and wherein the specific parameter includes at least one of: Channel Busy Ratio (CBR); Quality of Service (QoS); a physical layer priority; and geographic location information.

In some implementations, the second condition further includes that: the first UE does not successfully receives the PSSCH and/or the associated PSCCH transmitted by the second UE, and/or content of the feedback information corresponding to the PSSCH and/or the associated PSCCH is NACK.

In some implementations, if the first UE does not successfully receive the PSSCH and/or the associated PSCCH transmitted by the second UE, and/or if the content of the feedback information is NACK, the content of the first information and/or the feedback information further includes a reason for failure of receiving and/or transmitting NACK, wherein the reason includes at least one of: a conflict with other sidelink transmission; half-duplex; and low received power.

In some implementations, the resources preferred or not preferred by the first UE indicated in the first information and/or the feedback information transmitted by the first UE to the second UE are indicated in at least one of the following manners: indicating absolute positions of the resources preferred or not preferred by the first UE; indicating offsets between the resources preferred or not preferred by the first UE and resources of initial transmission of the PSSCH or PSCCH transmitted by the second UE; and indicating offsets between the resources preferred or not preferred by the first UE and resources of last or previous k-th transmission of the PSSCH or PSCCH transmitted by the second UE and/or transmission corresponding to the feedback information, where k is a positive integer.

In some implementations, the transmission parameters preferred or not preferred by the first UE indicated in the first information and/or the feedback information transmitted by the first UE to the second UE are indicated in at least one of the following manners: indicating values of the transmission parameters preferred or not preferred by the first UE; indicating offsets between the transmission parameters preferred or not preferred by the first UE and transmission parameters corresponding to initial transmission and/or last or previous k-th transmission of the PSSCH or PSCCH transmitted by the second UE and/or transmission of the feedback information, where k is a positive integer; and indicating adjustment directions between the transmission parameters preferred or not preferred by the first UE and transmission parameters corresponding to initial transmission and/or last or previous k-th transmission of the PSSCH or PSCCH transmitted by the second UE and/or transmission of the feedback information.

In some implementations, the transmitting of the first information and/or the feedback information corresponding to the PSSCH and/or the associated PSCCH by the first UE to the second UE comprises transmitting in at least one of the following manners: dropping the transmitting of the feedback information if the first UE transmits the first information to the second UE; and carrying the feedback information in the first information if the first UE transmits the first information to the second UE.

In some implementations, carrying the feedback information in the first information comprises at least one of the following manners: multiplexing the first information and the feedback information on same resources; and multiplexing the first information and the feedback information in a same PSSCH.

In some implementations, a condition for carrying the feedback information in the first information includes at least one of: a receiver of the first information and a receiver of the feedback information being a same UE; the first information and the feedback information corresponding to a same PSSCH and/or PSCCH; transmission resources of the first information and transmission resources of the feedback information satisfying a predetermined relationship; a payload size of the feedback information satisfying a specific threshold range and/or a number of Hybrid Automatic Repeat and request (HARQ) processes or PSSCHs corresponding to the feedback information satisfying a specific threshold range; a cast type of at least one of the first information, a PSSCH and/or PSCCH corresponding to the first information, and a PSSCH and/or PSCCH corresponding to the feedback information being a specific cast type; and a type of the HARQ-ACK feedback being a specific type.

In some implementations, a method for generating the feedback information carried in the first information comprises: if a PSSCH corresponding to the feedback information is groupcasted, and/or the first information corresponds to groupcast, and/or the first information is transmitted to a UE group by groupcast, and/or an identity of the UE group is indicated in the first information: generating the feedback information based on a configuration of the groupcast or the identity of the UE group; or generating the feedback information in a form of a HARQ-ACK codebook, wherein bits of the codebook correspond to members in the UE group.

Another embodiment of the present disclosure provides a method performed by a user equipment (UE), comprising: receiving, by a second UE, first information from a first UE, and selecting resources according to the first information; wherein content of the first information includes at least one content of the following contents: resources preferred by the first UE; resources not preferred by the first UE; a channel sensing result from the first UE; transmission parameters preferred by the first UE; and transmission parameters not preferred by the first UE.

In some implementations, the method further comprises: transmitting, by the second UE, a physical sidelink shared channel (PSSCH) and/or an associated physical sidelink control channel (PSCCH) to the first UE; and receiving, by the second UE after transmitting the PSSCH and/or the associated PSCCH to the first UE, at least one of the following from the first UE: the first information; and feedback information corresponding to the PSSCH and/or the associated PSCCH, wherein content indicated in the feedback information includes at least one of: HARQ-ACK feedback corresponding to the PSSCH and/or the associated PSCCH; resources preferred by the first UE; resources not preferred by the first UE; a channel sensing result from the first UE; transmission parameters preferred by the first UE; and transmission parameters not preferred by the first UE.

In some implementations, the content of the first information corresponds to at least one of the following transmission and/or reception: a previous transmission and/or reception of the first UE; a previous transmission and/or reception of the second UE; a subsequent transmission and/or reception of the first UE; and a subsequent transmission and/or reception of the second UE.

In some implementations, the receiving of the first information is triggered when a second condition is satisfied, and wherein the second condition includes at least one condition of the following conditions: the first information being received periodically and/or semi-statically; the receiving of the first information being triggered when a configured third condition is satisfied; and the receiving of the first information being triggered by predetermined signaling.

In some implementations, the receiving of the first information from the first UE by the second UE comprises: when a first condition is satisfied, receiving, by the second UE, the first information from the first UE and determining content of the received first information according to at least one of: a second condition that triggers the receiving of the first information; an identity of a UE that transmits and/or receives the first information; a number or value of certain content of the first information; a manner in which the first information is received; a cast type of transmission corresponding to the first information and/or whether the transmission is retransmission; an indication of the content of the first information; and a configured or defined fourth condition.

In some implementations, the first condition includes at least one of: the second UE always needing to determine the content of the received first information; the first UE and/or the second UE being configured or defined to enable or support more than one of the content of the first information, and/or the content of the first information corresponding to more than one of the transmission and/or reception; and the second UE being configured or defined to be required to determine the content of the received first information.

In some implementations, the determining of the content of the received first information by the second UE according to the second condition comprises at least one of: determining the content of the first information according to whether the receiving of the first information is triggered by the second condition; determining the content of the first information according to which one of the at least one condition the second condition is; and determining the content of the first information according to information indicated in the second condition.

In some implementations, the information indicated in the second condition includes information indicated in the predetermined signaling for determining the content of the first information when the receiving of the first information is triggered by the predetermined signaling.

In some implementations, the determining of the content of the first information according to the information indicated in the second condition comprises: determining which content or contents of the at least one content are included in the content of the first information, and/or determining a range and/or value of the content of the first information, according to the information indicated in the second condition.

In some implementations, the information indicated in the second condition includes: which content or contents of the at least one content are included in expected content of the first information, and/or a range and/or value of the expected content of the first information.

In some implementations, the information indicated in the second condition includes resources and/or transmission parameters preferred and/or not preferred by the second UE.

In some implementations, the information indicated in the second condition is determined based on sidelink transmission that the second UE needs to perform, when the second UE triggers the first UE to generate or transmit the first information because it needs to perform the sidelink transmission.

In some implementations, the information indicated in the second condition is indicated explicitly or implicitly when the information indicated in the second condition includes the range and/or value of the expected content of the first information, wherein indicating implicitly includes determining a range and/or value of the content of the first information according to a relationship between reference signaling and the first information and information of the reference signaling, wherein the reference signaling includes at least one of: signaling that carries the first information; the predetermined signaling in the second condition; and transmission signaling corresponding to the first information, wherein a relationship between the reference signaling and the first information is configured or defined, and/or indicated with a specific domain in the second condition, and wherein the transmission signaling corresponding to the first information includes: data transmitted by the second UE to the first UE, including initial transmission or retransmission of the PSSCH and/or the associated PSCCH transmitted by the second UE to the first UE; and/or data transmitted by the first UE to the second UE, including initial transmission or retransmission of the PSSCH and/or the associated PSCCH transmitted by the first UE to the second UE.

In some implementations, the information indicated in the second condition includes a first UE that needs to transmit the first information, and other UEs that satisfy the second condition do not need to transmit the first information.

In some implementations, the determining of the content of the received first information by the second UE according to the identity of the UE that transmits the first information comprises: determining the content of the first information according to a mapping relationship between a specific set of identities of the UE and the content of the first information.

In some implementations, the determining of the content of the received first information by the second UE according to the number or value of the certain content of the first information comprises: determining to include or not to include the certain content in the first information when the number or value of the certain content of the content of the first information satisfies a predetermined threshold interval.

In some implementations, the determining of the content of the received first information by the second UE according to the manner in which the first information is received comprises at least one of: determining the content of the first information according to a cast type of the first information; determining the content of the first information according to a type of signaling that carries the first information; and determining the content of the first information according to the first information and/or transmission signaling corresponding to the first information being initial transmission or retransmission.

In some implementations, the cast type of the transmission corresponding to the first information includes that: the cast type corresponding to the first information is a cast type of specific transmission, when the first information is used for the specific transmission, and/or when the first information is triggered by the specific transmission.

In some implementations, the determining of the content of the received first information by the second UE according to the indication of the content of the first information comprises at least one of: determining, by the second UE, the content of the first information required and indicating the required content to the first UE; and receiving, by the second UE, the indication of the content of the first information generated by the first UE from the first UE.

In some implementations, the fourth condition includes: whether a specific parameter satisfies a threshold range, and wherein the specific parameter includes at least one of: CBR; QoS; a physical layer priority; and geographic location information.

In some implementations, the second condition further includes that: the first UE does not successfully receives the PSSCH and/or the associated PSCCH transmitted by the second UE, and/or content of the feedback information corresponding to the PSSCH and/or the associated PSCCH is NACK.

In some implementations, if the first UE does not successfully receive the PSSCH and/or the associated PSCCH transmitted by the second UE, and/or if the content of the feedback information is NACK, the content of the first information and/or the feedback information further includes a reason for failure of receiving and/or transmitting NACK, wherein the reason includes at least one of: a conflict with other sidelink transmission; half-duplex; and low received power.

In some implementations, the resources preferred or not preferred by the first UE indicated in the first information and/or the feedback information from the first UE received by the second UE are indicated in at least one of the following manners: indicating absolute positions of the resources preferred or not preferred by the first UE; indicating offsets between the resources preferred or not preferred by the first UE and resources of initial transmission of the PSSCH or PSCCH transmitted by the second UE; and indicating offsets between the resources preferred or not preferred by the first UE and resources of last or previous k-th transmission of the PSSCH or PSCCH transmitted by the second UE and/or transmission corresponding to the feedback information, where k is a positive integer.

In some implementations, the transmission parameters preferred or not preferred by the first UE indicated in the first information and/or the feedback information from the first UE received by the second UE are indicated in at least one of the following manners: indicating values of the transmission parameters preferred or not preferred by the first UE; indicating offsets between the transmission parameters preferred or not preferred by the first UE and transmission parameters corresponding to initial transmission and/or last or previous k-th transmission of the PSSCH or PSCCH transmitted by the second UE and/or transmission of the feedback information, where k is a positive integer; and indicating adjustment directions between the transmission parameters preferred or not preferred by the first UE and transmission parameters corresponding to initial transmission and/or last or previous k-th transmission of the PSSCH or PSCCH transmitted by the second UE and/or transmission of the feedback information.

In some implementations, the receiving of the first information and/or the feedback information corresponding to the PSSCH and/or the associated PSCCH from the first UE by the second UE comprises receiving in at least one of the following manners: dropping the receiving of the feedback information if the second UE receives the first information from the first UE; and the feedback information being carried in the first information if the second UE receives the first information from the first UE.

In some implementations, carrying the feedback information in the first information comprises at least one of the following manners: multiplexing the first information and the feedback information on same resources; and multiplexing the first information and the feedback information in a same PSSCH.

In some implementations, a condition under which the feedback information is carried in the first information includes at least one of: a receiver of the first information and a receiver of the feedback information being a same UE; the first information and the feedback information corresponding to a same PSSCH and/or PSCCH; transmission resources of the first information and transmission resources of the feedback information satisfying a predetermined relationship; a payload size of the feedback information satisfying a specific threshold range and/or a number of HARQ processes or PSSCHs corresponding to the feedback information satisfying a specific threshold range; a cast type of at least one of the first information, a PSSCH and/or PSCCH corresponding to the first information, and a PSSCH and/or PSCCH corresponding to the feedback information being a specific cast type; and a type of the HARQ-ACK feedback being a specific type.

In some implementations, the feedback information carried in the first information is generated by: if a PSSCH corresponding to the feedback information is groupcasted, and/or the first information corresponds to groupcast, and/or the first information is transmitted to a UE group by groupcast, and/or an identity of the UE group is indicated in the first information: the feedback information being generated based on a configuration of the groupcast or the identity of the UE group; or the feedback information being generated in a form of a HARQ-ACK codebook, wherein bits of the codebook correspond to members in the UE group.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal in a wireless communication system, the method comprising:
identifying that a procedure associated with determination of a set of resources for transmission of a second terminal is triggered;
identifying at least one parameter associated with the procedure, the at least one parameter being configured by a higher layer;
determining a set of preferred resources or a set of non-preferred resources for the transmission of the second terminal, based on the at least one parameter; and
in case that the procedure is triggered by a condition at the first terminal. transmitting, to the second terminal, information including the set of non-preferred resources, in a groupcast or broadcast manner.

2. The method of claim 1, further comprising:
in case that the procedure is triggered by a request from the second terminal, identifying a timing range based on the request from the second terminal.

3. The method of claim 2, wherein the set of preferred resources or the set of non-preferred resources is determined within the timing range.

4. The method of claim 1, further comprising:
determining resources not preferred by the first terminal, based on sidelink control information (SCI) indicating resources reserved for a physical sidelink shared channel (PSSCH) transmission.

5. The method of claim 4, further comprising:
receiving sidelink data from the second terminal via the PSSCH; and
in response to the reception of the sidelink data, transmitting, to the second terminal via a physical sidelink feedback channel (PSFCH), information associated with the resources not preferred by the first terminal.

6. The method of claim 5, wherein the information associated with the resources not preferred by the first terminal is transmitted based on an identity of the second terminal.

7. The method of claim 1, wherein the set of preferred resources or the set of non-preferred resources is used to determine resource information of the second terminal.

8. A method performed by a second terminal in a wireless communication system, the method comprising:
in case that a procedure associated with determination of a set of resources for transmission of the second terminal is triggered, receiving, from a first terminal, information including a set of non-preferred resources for the transmission of the second terminal,
wherein, in case that the procedure is triggered by a condition at the first terminal, the information including the set of non-preferred resources is received in a groupcast or broadcast manner, and
wherein the set of non-preferred resources or a set of preferred resources for the transmission of the second terminal is determined based on at least one parameter associated with the procedure, the at least one parameter being configured by a higher layer; and
determining resource information for the transmission of the second terminal, based on the set of non-preferred resources.

9. The method of claim 8, wherein in case that the procedure is triggered by a request from the second terminal, the request is associated with a timing range.

10. The method of claim 9, wherein the set of preferred resources or the set of non-preferred resources is determined within the timing range.

11. A first terminal in a wireless communication system, the first terminal comprising:
a transceiver; and
at least one processor coupled with the transceiver and configured to:
identify that a procedure associated with determination of a set of resources for transmission of a second terminal is triggered;
identify at least one parameter associated with the procedure, the at least one parameter being configured by a higher layer;
determine a set of preferred resources or a set of non-preferred resources for the transmission of the second terminal, based on the at least one parameter;
in case that the procedure is triggered by a condition at the first terminal, transmit, to the second terminal via the transceiver, information including the set of non-preferred resources, in a groupcast or broadcast.

12. A second terminal in a wireless communication system, the second terminal comprising:
a transceiver; and
at least one processor coupled with the transceiver and configured to:
in case that a procedure associated with determination of a set of resources for transmission of the second terminal is triggered, receive, from a first terminal via the transceiver, information including a set of non-preferred resources for the transmission of the second terminal,
wherein. in case that the procedure is triggered by a condition at the first terminal, the information including the set of non-preferred resources is received in a groupcast or broadcast manner, and
wherein the set of non-preferred resources or a set of preferred resources for the transmission of the second terminal is determined based on at least one parameter associated with the procedure, the at least one parameter being configured by a higher layer; and
determine resource information for the transmission of the second terminal, based on the set of non-preferred resources.

* * * * *